US009900912B2

(12) United States Patent
Huang et al.

(10) Patent No.: US 9,900,912 B2
(45) Date of Patent: Feb. 20, 2018

(54) DATA TRANSMISSION METHOD, DEVICE AND SYSTEM

(71) Applicant: Huawei Technologies Co., Ltd., Shenzhen (CN)

(72) Inventors: Qufang Huang, Shanghai (CN); Jian Zhang, Shanghai (CN); Qinghai Zeng, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 117 days.

(21) Appl. No.: 15/006,673

(22) Filed: Jan. 26, 2016

(65) Prior Publication Data

US 2016/0212769 A1    Jul. 21, 2016

Related U.S. Application Data

(63) Continuation of application No. PCT/CN2013/080221, filed on Jul. 26, 2013.

(51) Int. Cl.
| | | |
|---|---|---|
| *H04W 4/00* | (2009.01) | |
| *H04W 74/08* | (2009.01) | |
| *H04L 27/26* | (2006.01) | |
| *H04W 56/00* | (2009.01) | |
| *H04W 72/04* | (2009.01) | |
| *H04W 88/06* | (2009.01) | |

(52) U.S. Cl.
CPC ..... *H04W 74/0833* (2013.01); *H04L 27/2613* (2013.01); *H04W 56/0045* (2013.01); *H04W 72/0446* (2013.01); *H04W 88/06* (2013.01)

(58) Field of Classification Search
CPC ...... H04W 72/04; H04W 88/08; H04W 76/00
See application file for complete search history.

(56) References Cited

U.S. PATENT DOCUMENTS

| 8,462,688 | B1 | 6/2013 | Dinan | |
|---|---|---|---|---|
| 2007/0230600 | A1* | 10/2007 | Bertrand | H04J 13/00 375/260 |
| 2010/0113051 | A1* | 5/2010 | Du | H04W 74/002 455/450 |
| 2011/0310747 | A1* | 12/2011 | Seo | H04B 7/2606 370/246 |
| 2012/0008575 | A1* | 1/2012 | Vujcic | H04W 74/002 370/329 |

(Continued)

FOREIGN PATENT DOCUMENTS

| CN | 101778482 A | 7/2010 |
|---|---|---|
| CN | 102448182 A | 5/2012 |

(Continued)

*Primary Examiner* — Siren Wei
(74) *Attorney, Agent, or Firm* — Slater Matsil, LLP

(57) ABSTRACT

Embodiments provide a data transmission method, a device, and a system. The method includes: acquiring, by user equipment, a first preamble corresponding to a cell set of a primary timing advance group of a first base station and a second preamble corresponding to a cell set of a secondary timing advance group of a second base station; sending the first preamble to the first base station, to initiate random access to the first base station according to the first preamble; and sending the second preamble to the second base station, to initiate random access to the second base station according to the second preamble.

22 Claims, 12 Drawing Sheets

(56) References Cited

U.S. PATENT DOCUMENTS

| | | | |
|---|---|---|---|
| 2012/0082103 | A1 | 4/2012 | Lin et al. |
| 2012/0300714 | A1 | 11/2012 | Ng et al. |
| 2013/0058315 | A1* | 3/2013 | Feuersanger ....... H04W 52/281 370/336 |
| 2014/0016615 | A1 | 1/2014 | Nanri et al. |
| 2014/0307593 | A1 | 10/2014 | Zhao et al. |
| 2016/0073431 | A1* | 3/2016 | Park .................. H04W 72/1284 370/329 |

FOREIGN PATENT DOCUMENTS

| | | | |
|---|---|---|---|
| CN | 102523627 A | 6/2012 | |
| EP | 2214449 A1 | 8/2010 | |
| EP | 2785122 A1 | 10/2014 | |
| JP | 2012231366 A | 11/2012 | |
| JP | 2013529403 A | 7/2013 | |
| JP | 2014526834 A | 10/2014 | |
| WO | 2011120716 A1 | 10/2011 | |
| WO | 2013040026 A1 | 3/2013 | |
| WO | 2013042908 A1 | 3/2013 | |
| WO | 2013091515 A1 | 6/2013 | |
| WO | WO 2013114925 A1 * | 8/2013 | ............ H04W 52/34 |

* cited by examiner

DATA TRANSMISSION METHOD, DEVICE AND SYSTEM

This application is a continuation of International Application No. PCT/CN2013/080221, filed on Jul. 26, 2013, which is hereby incorporated by reference in its entirety.

TECHNICAL FIELD

The present invention relates to the communications field, and in particular, to a data transmission method, a device, and a system.

BACKGROUND

A carrier aggregation (CA) technology allows user equipment (UE) to simultaneously use multiple component carriers (CC) to perform uplink and downlink communication, and implements high-speed data transmission. In addition, the CA technology enables multiple base stations to simultaneously undertake transmission of a data service of user equipment. UE that is in a coverage area shared by multiple adjacent base stations may aggregate cells provided by the multiple base stations, so that the multiple base stations simultaneously undertake transmission of the data service of the user equipment. During this process, data synchronization between the UE and the multiple base stations is required.

For a process in which UE accesses a base station, specific implementation of the CA technology is as follows: the UE obtains timing advance TA (TA) for initial uplink sending by performing random access to the base station, and then the base station continuously adjusts uplink sending of the UE according to a time at which uplink data is received. During a process of random access, the UE sends one preamble (preamble) to the base station, where the preamble sent by the UE in a cell is calculated according to a cell identity and a parameter that is included in a broadcast message. 64 available preambles exist in one cell and are classified into two types: a dedicated preamble and a public preamble. The dedicated preamble is allocated by a base station for use and the public preamble is selected by UE for use. After determining to initiate random access, the UE randomly selects one preamble from a public preamble resource pool and sends the preamble to the base station. If the UE needs to transmit uplink data, the UE selects one preamble and initiates contention-based random access; if the base station needs to transmit downlink data, the base station selects one dedicated preamble for the UE, informs the UE of the dedicated preamble, and instructs the UE to initiate random access, where because the preamble is dedicated, there is no conflict between the UE and another UE, and the random access is referred to as non-contention based random access.

The prior art is specific to carrier aggregation for a cell of a single base station, however, in a carrier aggregation scenario in which there are multiple base stations, how to implement random access among user equipment and different base stations is a problem expected to be resolved in the industry.

SUMMARY

Embodiments provide a data transmission method, a device, and a system, which can implement simultaneous random access of user equipment to multiple base stations, thereby reducing delays of the random access of the user equipment to the multiple base stations, and speeding up processes of the random access of the user equipment to the multiple base stations.

To achieve the foregoing objectives, the following technical solutions are used in the embodiments.

According to a first aspect, a data transmission method is provided, including: acquiring, by user equipment, a first preamble and a second preamble, where the first preamble corresponds to a cell set of a primary timing advance group PTAG of a first base station, and the second preamble corresponds to a cell set of a secondary timing advance group STAG of a second base station. The method includes sending, by the user equipment, the first preamble to the first base station, to initiate random access to the first base station according to the first preamble. The method also includes sending, by the user equipment, the second preamble to the second base station, to initiate random access to the second base station according to the second preamble.

With reference to the data transmission method in the first aspect, in a first possible implementation manner, the method further includes. acquiring, by the user equipment, a first channel resource, where the first channel resource is a physical random access channel PRACH resource of the first base station, and the first channel resource includes a subframe set that is to be used to carry the first preamble. The method also includes acquiring, by the user equipment, a second channel resource, where the second channel resource is a physical random access channel resource of the second base station, and the second channel resource includes a subframe set that is to be used to carry the second preamble.

With reference to the data transmission method in the first possible implementation manner of the first aspect, in a second possible implementation manner, the acquiring, by the user equipment, a first channel resource specifically includes: receiving, by the user equipment by using a system broadcast message, the first channel resource sent by the first base station. The acquiring, by the user equipment, a second channel resource specifically includes receiving, by the user equipment by using dedicated signaling, the second channel resource sent by the second base station, where the subframe set that is to be used to carry the first preamble and that is in the first channel resource and the subframe set that is to be used to carry the second preamble and that is in the second channel resource are in different timeslots.

With reference to the data transmission method in the first or the second possible implementation manner of the first aspect, in a third possible implementation manner, the sending, by the user equipment, the first preamble to the first base station, and sending the second preamble to the second base station specifically includes determining, by the user equipment, a subframe that carries the first preamble and that is in the first channel resource and a subframe that carries the second preamble and that is in the second channel resource, and determining that a sending time of the first preamble does not overlap with a sending time of the second preamble; sending, by the user equipment, the first preamble to the first base station in the subframe that carries the first preamble; and sending, by the user equipment, the second preamble to the second base station in the subframe that carries the second preamble.

With reference to the data transmission method in the first or the second possible implementation manner of the first aspect, in a fourth possible implementation manner, when a sending time of the first preamble overlaps with a sending time of the second preamble, the method further includes: postponing, by the user equipment to another subframe, the time for sending the first preamble to the first base station, so that a sending time of the first preamble does not overlap with the sending time of the second preamble; or postponing, by the user equipment to another subframe, the time for sending the second preamble to the second base station, so that the sending time of the first preamble does not overlap with a sending time of the second preamble; or when the first preamble is a public preamble, postponing, by the user equipment to another subframe, the time for sending the first preamble corresponding to contention-based random access to the first base station, so that a sending time of the first preamble does not overlap with the sending time of the second preamble; or when the second preamble is a public preamble, postponing, by the user equipment to another subframe, the time for sending the second preamble corresponding to contention-based random access to the second base station, so that the sending time of the first preamble does not overlap with a sending time of the second preamble; or when a time indicating a next subframe of a subframe that is to be used to carry the first preamble and that is in the first channel resource is earlier than a time indicating a next subframe of a subframe that is to be used to carry the second preamble and that is in the second channel resource, postponing, by the user equipment to the next subframe of the subframe that is to be used to carry the first preamble, the time for sending the first preamble to the first base station, so that a sending time of the first preamble does not overlap with the sending time of the second preamble; or when a time indicating a next subframe of a subframe that is to be used to carry the first preamble and that is in the second channel resource is earlier than a time indicating a next subframe of a subframe that is to be used to carry the second preamble and that is in the first channel resource, postponing, by the user equipment to the next subframe of the subframe that is to be used to carry the second preamble, the time for sending the second preamble to the second base station, so that the sending time of the first preamble does not overlap with a sending time of the second preamble.

With reference to the data transmission method in the first or the second possible implementation manner of the first aspect, in a fifth possible implementation manner: the sending, by the user equipment, the first preamble to the first base station, and sending the second preamble to the second base station specifically includes: selecting, by the user equipment, a subframe that carries the first preamble and that is in the first channel resource and a subframe that carries the second preamble and that is in the second channel resource, where a sum of transmit power of the subframe that carries the first preamble and transmit power of the subframe that carries the second preamble is less than or equal to maximum transmit power of the user equipment; sending, by the user equipment, the first preamble to the first base station in the subframe that carries the first preamble; and sending, by the user equipment, the second preamble to the second base station in the subframe that carries the second preamble.

With reference to the data transmission method in the first or the second possible implementation manner of the first aspect, in a sixth possible implementation manner: when the first preamble is a public preamble, the sending, by the user equipment, the first preamble to the first base station specifically includes: when a sending time of the message 3 corresponding to the first preamble overlaps with a sending time of the second preamble, postponing, by the user equipment to another subframe, the time for sending the message 3 corresponding to the first preamble to the first base station, so that a sending time of the message 3 corresponding to the first preamble does not overlap with the sending time of the second preamble; or adjusting, by the user equipment, transmit power of the subframe that carries the message 3 corresponding to the first preamble, where a sum of adjusted transmit power of the subframe that carries the message 3 corresponding to the first preamble and transmit power of a subframe that carries the second preamble and that is in the second channel resource is less than or equal to maximum transmit power of the user equipment; or canceling, by the user equipment, sending of the message 3, where the message 3 corresponds to the first preamble; and when the second preamble is a public preamble, the sending, by the user equipment, the second preamble to the second base station specifically includes: when a sending time of the message 3 corresponding to the second preamble overlaps with a sending time of the first preamble: postponing, by the user equipment to another subframe, the time for sending the message 3 corresponding to the second preamble to the second base station, so that a sending time of the message 3 corresponding to the second preamble does not overlap with the sending time of the first preamble; or adjusting, by the user equipment, transmit power of the subframe that carries the message 3 corresponding to the second preamble, where a sum of adjusted transmit power of the subframe that carries the message 3 corresponding to the second preamble and transmit power of a subframe that carries the first preamble and that is in the first channel resource is less than or equal to maximum transmit power of the user equipment; or canceling, by the user equipment, sending of the message 3, where the message 3 corresponds to the second preamble.

With reference to the data transmission method in the first aspect or the first or the second possible implementation manner of the first aspect, in a seventh possible implementation manner, the sending, by the user equipment, the first preamble to the first base station, and sending the second preamble to the second base station specifically includes: simultaneously sending, by the user equipment, the first preamble to the first base station and the second preamble to the second base station; or sending, by the user equipment, the second preamble to the second base station during a process of performing random access to the first base station; or sending, by the user equipment, the first preamble to the first base station during a process of performing random access to the second base station.

According to a second aspect, a data transmission method is provided. The method includes receiving, by a first base station, a first preamble sent by the user equipment, where the first preamble corresponds to a cell set of a primary timing advance group PTAG of the first base station. The method also includes performing, by the first base station according to the first preamble, random access for the user equipment during a process in which the user equipment performs random access to a second base station, where a second preamble that is required for the user equipment to perform the random access to the second base station corresponds to a cell set of a secondary timing advance group STAG of the second base station.

With reference to the second aspect, in a first possible implementation manner, before the receiving, by user equipment, the first preamble or the second preamble sent by the user equipment, the method further includes: configuring, by the first base station, a first channel resource, where the first channel resource is a physical random access channel PRACH resource of the first base station, and the first channel resource includes a subframe set that is to be used to carry the first preamble.

With reference to the data transmission method in the first possible implementation manner of the second aspect, in a second possible implementation manner, the method further includes: sending, by the base station, system broadcast or dedicated signaling to the user equipment, where the system broadcast includes the first channel resource, and a subframe set that is to be used to carry the second preamble and that is in a second channel resource and the subframe set that is to be used to carry the first preamble and that is in the first channel resource are in different timeslots, where the subframe sets are acquired by the user equipment.

With reference to the data transmission method in the first or the second possible implementation manner of the second aspect, in a third possible implementation manner, the configuring, by the first base station, a first channel resource specifically includes: receiving, by the first base station, the second channel resource sent by the second base station; and configuring, by the first base station, the first channel resource for the user equipment according to the second channel resource.

With reference to the data transmission method in the first or the second possible implementation manner of the second aspect, in a fourth possible implementation manner, the method further includes: receiving, by the first base station, a second channel resource sent by the second base station; and ending, by the first base station to the user equipment, a channel resource that does not overlap with the second channel resource and that is in the first channel resource, where a subframe set that is to be used to carry the first preamble and that is in the channel resource that does not overlap with the second channel resource and is in the first channel resource and a subframe set that is to be used to carry the second preamble and that is in the second channel resource are in different timeslots.

According to a third aspect, user equipment is provided. The user equipment includes a processing unit and a sending unit, where the processing unit is configured to acquire a first preamble and a second preamble, where the first preamble corresponds to a cell set of a primary timing advance group PTAG of a first base station, and the second preamble corresponds to a cell set of a secondary timing advance group STAG of a second base station. The sending unit is configured to send the first preamble acquired by the processing unit to the first base station. The processing unit is further configured to initiate random access to the first base station according to the first preamble. The sending unit is further configured to send the second preamble acquired by the processing unit to the second base station. The processing unit is further configured to initiate random access to the second base station according to the second preamble.

With reference to the user equipment in the third aspect, in a first possible implementation manner, the user equipment further includes a receiving unit. The receiving unit is configured to acquire a first channel resource, where the first channel resource is a physical random access channel PRACH resource of the first base station, and the first channel resource includes a subframe set that is to be used to carry the first preamble. The receiving unit is further configured to acquire a second channel resource, where the second channel resource is a physical random access channel resource of the second base station, and the second channel resource includes a subframe set that is to be used to carry the second preamble.

With reference to the user equipment in the first possible implementation manner of the third aspect, in a second possible implementation manner, the receiving unit is specifically configured to receive, by using a system broadcast message, the first channel resource sent by the first base station. The receiving unit is also specifically configured to receive, by using dedicated signaling, the second channel resource sent by the second base station, where the subframe set that is to be used to carry the first preamble and that is in the first channel resource and the subframe set that is to be used to carry the second preamble and that is in the second channel resource are in different timeslots.

With reference to the user equipment in the first or the second possible implementation manner of the third aspect, in a third possible implementation manner, the processing unit is specifically configured to determine a subframe that carries the first preamble and that is in the first channel resource and a subframe that carries the second preamble and that is in the second channel resource, and determine that a sending time of the first preamble does not overlap with a sending time of the second preamble. The sending unit is specifically configured to send the first preamble to the first base station in the subframe that carries the first preamble and that is determined by the processing unit. The sending unit is specifically configured to send the second preamble to the second base station in the subframe that carries the second preamble and that is determined by the processing unit.

With reference to the user equipment in the first or the second possible implementation manner of the third aspect, in a fourth possible implementation manner, when a sending time of the first preamble overlaps with a sending time of the second preamble, the processing unit is further specifically configured to postpone, to another subframe, the time for sending the first preamble to the first base station, so that a sending time of the first preamble does not overlap with the sending time of the second preamble; or the processing unit is further specifically configured to postpone, to another subframe, the time for sending the second preamble to the second base station, so that the sending time of the first preamble does not overlap with a sending time of the second preamble; or when the first preamble is a public preamble, the processing unit is further specifically configured to postpone, to another subframe, the time for sending the first preamble corresponding to contention-based random access to the first base station, so that a sending time of the first preamble does not overlap with the sending time of the second preamble; or when the second preamble is a public preamble, the processing unit is further specifically configured to postpone, to another subframe, the time for sending the second preamble corresponding to contention-based random access to the second base station, so that the sending time of the first preamble does not overlap with a sending time of the second preamble; or when a time indicating a next subframe of a subframe that is to be used to carry the first preamble and that is in the first channel resource is earlier than a time indicating a next subframe of a subframe that is to be used to carry the second preamble and that is in the second channel resource, the processing unit is specifically configured to postpone, to the next subframe of the subframe that is to be used to carry the first preamble, the time for sending the first preamble to the first base station, so that a sending time of the first preamble does not overlap with the sending time of the second preamble; or when a time indicating a next subframe of a subframe that is to be used to carry the first preamble and that is in the second channel resource is earlier than a time indicating a next subframe of a subframe that is to be used to carry the second preamble and that is in the first channel resource, the processing unit is specifically configured to postpone, to the next subframe of the subframe that is to be used to carry the second preamble, the time for sending the second preamble to the second base station, so that the sending time of the first preamble does not overlap with a sending time of the second preamble.

With reference to the user equipment in the first or the second possible implementation manner of the third aspect, in a fifth possible implementation manner, the processing unit is specifically configured to select a subframe that carries the first preamble and that is in the first channel resource and a subframe that carries the second preamble and that is in the second channel resource, where a sum of transmit power of the subframe that carries the first preamble and transmit power of the subframe that carries the second preamble is less than or equal to maximum transmit power of the user equipment. The sending unit is specifically configured to send the first preamble to the first base station in the subframe that carries the first preamble and that is selected by the processing unit. The sending unit is specifically configured to send the second preamble to the second base station in the subframe that carries the second preamble and that is selected by the processing unit.

With reference to the user equipment in the first or the second possible implementation manner of the third aspect, in a sixth possible implementation manner, when a sending time of the message 3 corresponding to the first preamble overlaps with a sending time of the second preamble, the processing unit is specifically configured to postpone, to another subframe, the time for sending the message 3 corresponding to the first preamble to the first base station, so that a sending time of the message 3 corresponding to the first preamble does not overlap with the sending time of the second preamble; or the processing unit is specifically configured to adjust transmit power of the subframe that carries the message 3 corresponding to the first preamble, where a sum of adjusted transmit power of the subframe that carries the message 3 corresponding to the first preamble and transmit power of a subframe that carries the second preamble and that is in the second channel resource is less than or equal to maximum transmit power of the user equipment; or the processing unit is specifically configured to cancel sending of the message 3, where the message 3 corresponds to the first preamble. When a sending time of the message 3 corresponding to the second preamble overlaps with a sending time of the first preamble, the processing unit is specifically configured to postpone, to another subframe, the time for sending the message 3 corresponding to the second preamble to the second base station, so that a sending time of the message 3 corresponding to the second preamble does not overlap with the sending time of the first preamble; or the processing unit is specifically configured to adjust transmit power of the subframe that carries the message 3 corresponding to the second preamble, where a sum of adjusted transmit power of the subframe that carries the message 3 corresponding to the second preamble and transmit power of a subframe that carries the first preamble and that is in the first channel resource is less than or equal to maximum transmit power of the user equipment; or the processing unit is specifically configured to cancel sending of the message 3, where the message 3 corresponds to the second preamble.

With reference to the user equipment in the third aspect or the first or the second possible implementation manner of the third aspect, in a seventh possible implementation manner, the sending unit is specifically configured to simultaneously send the first preamble acquired by the processing unit to the first base station and the second preamble acquired by the processing unit to the second base station; or the sending unit is specifically configured to: during a process in which the user equipment performs random access to the first base station, send the second preamble acquired by the processing unit to the second base station; or the sending unit is specifically configured to: during a process in which the user equipment performs random access to the second base station, send the first preamble acquired by the processing unit to the first base station.

According to a fourth aspect, a base station is provided, where the base station includes a receiving unit and an access unit, the receiving unit is configured to receive a first preamble sent by the user equipment, where the first preamble corresponds to a cell set of a primary timing advance group PTAG of the first base station; and the access unit is configured to: during a process in which the user equipment performs random access to a second base station, perform random access for the user equipment according to the first preamble received by the receiving unit, where a second preamble that is required for the user equipment to perform the random access to the second base station corresponds to a cell set of a secondary timing advance group STAG of the second base station.

With reference to the base station in the fourth aspect, in a first possible implementation manner, the access unit is further configured to configure a first channel resource for the user equipment, where the first channel resource is a physical random access channel PRACH resource of the base station, and the first channel resource includes a subframe set that is to be used to carry the first preamble.

With reference to the base station in the first possible implementation manner of the fourth aspect, in a second possible implementation manner, the base station further includes a sending unit, where the sending unit is configured to send system broadcast or dedicated signaling to the user equipment, where the system broadcast includes the first channel resource configured by the access unit, an a subframe set that is to be used to carry the second preamble and that is in a second channel resource and the subframe set that is to be used to carry the first preamble and that is in the first channel resource are in different timeslots, where the subframe sets are acquired by the user equipment.

With reference to the base station in the first or the second possible implementation manner of the fourth aspect, in a third possible implementation manner, the receiving unit is further configured to receive the second channel resource sent by the second base station; and the access unit is further configured to configure, according to the second channel resource received by the receiving unit, the first channel resource for the user equipment.

With reference to the base station in the first or the second possible implementation manner of the fourth aspect, in a fourth possible implementation manner, the receiving unit is further configured to receive the second channel resource sent by the second base station; and the sending unit is further configured to send, to the user equipment, a channel resource that does not overlap with the second channel resource received by the receiving unit and that is in the first channel resource, where a subframe set that is to be used to carry the first preamble and that is in the channel resource that does not overlap with the second channel resource and is in the first channel resource and a subframe set that is to be used to carry the second preamble and that is in the second channel resource are in different timeslots.

According to a fifth aspect, user equipment is provided. The user equipment includes at least one processor, a memory, a transmitter, a receiver, and a data bus; the data bus is configured to implement connection and communication among the processor, the memory, the receiver, and the transmitter. The processor is configured to acquire a first preamble and a second preamble by using the receiver, where the first preamble corresponds to a cell set of a primary timing advance group PTAG of a first base station, and the second preamble corresponds to a cell set of a secondary timing advance group STAG of a second base station. The processor is further configured to send the first preamble to the first base station by using the transmitter, to initiate random access to the first base station according to the first preamble. The processor is further configured to send the second preamble to the second base station by using the transmitter, to initiate random access to the second base station according to the second preamble.

With reference to the user equipment in the fifth aspect, in a first possible implementation manner, the processor is further configured to acquire a first channel resource by using the receiver, where the first channel resource is a physical random access channel PRACH resource of the first base station, and the first channel resource includes a subframe set that is to be used to carry the first preamble. The processor is further configured to acquire a second channel resource by using the receiver, where the second channel resource is a physical random access channel resource of the second base station, and the second channel resource includes a subframe set that is to be used to carry the second preamble.

With reference to the user equipment in the first possible implementation manner of the fifth aspect, in a second possible implementation manner, the processor is further configured to receive, by using a system broadcast message received by the receiver, the first channel resource sent by the first base station. The processor is further configured to receive, by using dedicated signaling received by the receiver, the second channel resource sent by the second base station, where the subframe set that is to be used to carry the first preamble and that is in the first channel resource and the subframe set that is to be used to carry the second preamble and that is in the second channel resource are in different timeslots.

With reference to the user equipment in the first or the second possible implementation manner of the fifth aspect, in a third possible implementation manner, the processor is further configured to determine a subframe that carries the first preamble and that is in the first channel resource and a subframe that carries the second preamble and that is in the second channel resource, and determine that a sending time of the first preamble does not overlap with a sending time of the second preamble. The processor is further configured to send, by using the transmitter, the first preamble to the first base station in the subframe that carries the first preamble. The processor is further configured to send, by using the transmitter, the second preamble to the second base station in the subframe that carries the second preamble.

With reference to the user equipment in the first or the second possible implementation manner of the fifth aspect, in a fourth possible implementation manner, when a sending time of the first preamble overlaps with a sending time of the second preamble, the processor is further configured to postpone, to another subframe, the time for sending the first preamble to the first base station, so that a sending time of the first preamble does not overlap with the sending time of the second preamble; or the processor is further configured to postpone, to another subframe, the time for sending the second preamble to the second base station, so that the sending time of the first preamble does not overlap with a sending time of the second preamble; or when the first preamble is a public preamble, the processor is further configured to postpone, to another subframe, the time for sending the first preamble corresponding to contention-based random access to the first base station, so that a sending time of the first preamble does not overlap with the sending time of the second preamble; or when the second preamble is a public preamble, the processor is further configured to postpone, to another subframe, the time for sending the second preamble corresponding to contention-based random access to the second base station, so that the sending time of the first preamble does not overlap with a sending time of the second preamble; or when a time indicating a next subframe of a subframe that is to be used to carry the first preamble and that is in the first channel resource is earlier than a time indicating a next subframe of a subframe that is to be used to carry the second preamble and that is in the second channel resource, the processor is further configured to postpone, to the next subframe of the subframe that is to be used to carry the first preamble, the time for sending the first preamble to the first base station, so that a sending time of the first preamble does not overlap with the sending time of the second preamble; or when a time indicating a next subframe of a subframe that is to be used to carry the first preamble and that is in the second channel resource is earlier than a time indicating a next subframe of a subframe that is to be used to carry the second preamble and that is in the first channel resource, the processor is further configured to postpone, to the next subframe of the subframe that is to be used to carry the second preamble, the time for sending the second preamble to the second base station, so that the sending time of the first preamble does not overlap with a sending time of the second preamble.

With reference to the user equipment in the first or the second possible implementation manner of the fifth aspect, in a fifth possible implementation manner, the processor is specifically configured to select a subframe that carries the first preamble and that is in the first channel resource and a subframe that carries the second preamble and that is in the second channel resource, where a sum of transmit power of the subframe that carries the first preamble and transmit power of the subframe that carries the second preamble is less than or equal to maximum transmit power of the user equipment. The processor is further configured to send, by using the transmitter, the first preamble to the first base station in the subframe that carries the first preamble. The processor is further configured to send, by using the transmitter, the second preamble to the second base station in the subframe that carries the second preamble.

With reference to the user equipment in the first or the second possible implementation manner of the fifth aspect, in a sixth possible implementation manner, when a sending time of the message 3 corresponding to the first preamble overlaps with a sending time of the second preamble, the processor is specifically configured to postpone, to another subframe, the time for sending the message 3 corresponding to the first preamble to the first base station, so that a sending time of the message 3 corresponding to the first preamble does not overlap with the sending time of the second preamble; or the processor is specifically configured to adjust transmit power of the subframe that carries the message 3 corresponding to the first preamble, where a sum of adjusted transmit power of the subframe that carries the message 3 corresponding to the first preamble and transmit power of a subframe that carries the second preamble and that is in the second channel resource is less than or equal to maximum transmit power of the user equipment; or the processor is specifically configured to cancel sending of the message 3, where the message 3 corresponds to the first preamble. When a sending time of the message 3 corresponding to the second preamble overlaps with a sending time of the first preamble: the processor is specifically configured to postpone, to another subframe, the time for sending the message 3 corresponding to the second preamble to the second base station, so that a sending time of the message 3 corresponding to the second preamble does not overlap with the sending time of the first preamble; or the processor is specifically configured to adjust transmit power of the subframe that carries the message 3 corresponding to the second preamble, where a sum of adjusted transmit power of the subframe that carries the message 3 corresponding to the second preamble and transmit power of a subframe that carries the first preamble and that is in the first channel resource is less than or equal to maximum transmit power of the user equipment; or the processor is specifically configured to cancel sending of the message 3, where the message 3 corresponds to the second preamble.

With reference to the user equipment in the fifth aspect or the first or the second possible implementation manner of the fifth aspect, in a seventh possible implementation manner: the processor is specifically configured to simultaneously send, by using the transmitter, the first preamble to the first base station and the second preamble to the second base station; or the processor is specifically configured to: during a process in which the user equipment performs random access to the first base station, send the second preamble to the second base station by using the transmitter; or the processor is specifically configured to: during a process in which the user equipment performs random access to the second base station, send the first preamble to the first base station by using the transmitter.

According to a sixth aspect, a base station is provided, where the base station includes at least one processor, a memory, a receiver, and a data bus; the data bus is configured to implement connection and communication among the processor, the memory, and the receiver; the processor is configured to receive, by using the receiver, a first preamble sent by the user equipment, where the first preamble corresponds to a cell set of a primary timing advance group PTAG of the first base station; and the processor is further configured to: during a process in which the user equipment performs random access to a second base station, perform random access for the user equipment according to the first preamble, where a second preamble that is required for the user equipment to perform the random access to the second base station corresponds to a cell set of a secondary timing advance group STAG of the second base station.

With reference to the sixth aspect, in a first possible implementation manner: the processor is further configured to configure a first channel resource for the user equipment, where the first channel resource is a physical random access channel PRACH resource of the base station, and the first channel resource includes a subframe set that is to be used to carry the first preamble.

With reference to the base station in the first possible implementation manner of the sixth aspect, in a second possible implementation manner, the base station further includes a transmitter connected to the data bus; and the processor sends system broadcast or dedicated signaling to the user equipment by using the transmitter, where the system broadcast includes the first channel resource, where a subframe set that is to be used to carry the second preamble and that is in a second channel resource and the subframe set that is to be used to carry the first preamble and that is in the first channel resource are in different timeslots, where the subframe sets are acquired by the user equipment.

With reference to the base station in the first or the second possible implementation manner of the sixth aspect, in a third possible implementation manner, the processor is further configured to receive, by using the receiver, the second channel resource sent by the second base station; and the processor is further configured to configure the first channel resource for the user equipment according to the second channel resource.

With reference to the base station in the first or the second possible implementation manner of the sixth aspect, in a fourth possible implementation manner: the processor is further configured to receive, by using the receiver, the second channel resource sent by the second base station; and the processor is further configured to send, to the user equipment by using the transmitter, a channel resource that does not overlap with the second channel resource and that is in the first channel resource, where a subframe set that is to be used to carry the first preamble and that is in the channel resource that does not overlap with the second channel resource and is in the first channel resource and the subframe set that is to be used to carry the second preamble and that is in the second channel resource are in different timeslots.

According to a seventh aspect, a communications system is provided, including at least two base stations and at least one user equipment, where the base stations are the foregoing base stations, one base station serves as a first base station, at least one base station serves as a second base station, and the user equipment is the foregoing user equipment.

According to the data transmission method, the device, the system that are provided in the embodiments of the present invention, user equipment can simultaneously send, to multiple base stations, preambles used for random access, so as to implement that the user equipment simultaneously initiates parallel random access to the multiple base stations, thereby reducing delays of the random access of the user equipment to the multiple base stations, and speeding up processes of the random access of the user equipment to the multiple base stations.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

Figure 1:
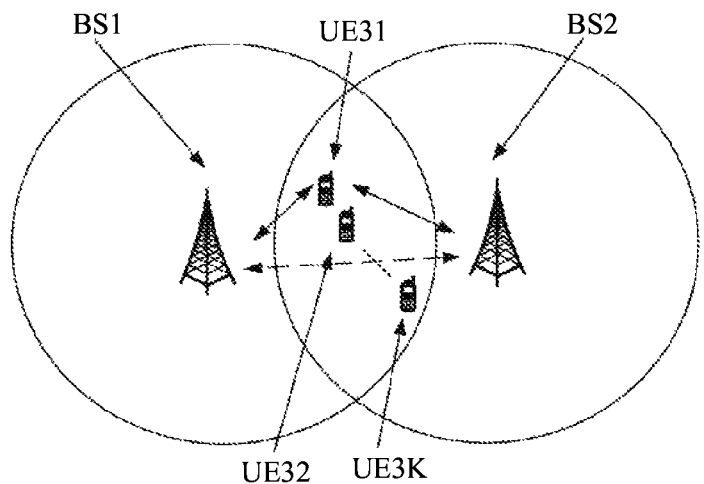
FIG. 1 is a schematic structural diagram of a communications system according to an embodiment.

The following clearly describes the technical solutions in the embodiments with reference to the accompanying drawings in the embodiments. Apparently, the described embodiments are merely a part rather than all of the embodiments.

Various aspects involved in the embodiments are described in this specification with reference to a terminal and/or a base station.

The terminal refers to a device that provides a user with voice and/or data connectivity, and includes a wireless terminal or a wired terminal. The wireless terminal may be a handheld device with a radio connection function, another processing device connected to a radio modem, or a mobile terminal that communicates with one or more core networks through a radio access network. For example, the wireless terminal may be a mobile phone (also referred to as a "cellular" phone) and a computer with a mobile terminal. For another example, the wireless terminal may also be a portable, pocket-sized, handheld, computer built-in, or in-vehicle mobile apparatus. For still another example, the wireless terminal may be a mobile station (MS), an access point (AP), or user equipment (UE), or the like. For ease of description, the foregoing terminals are collectively referred to as UE in the embodiments.

The base station (BS) may refer to a device that communicates with a wireless terminal via one or more cells at an air interface in an access network. For example, the base station may be a base station (BTS) in the Global System for Mobile Communications (GSM) or the Code-Division Multiple Access (CDMA), may also be a base station (English: NodeB) in the Wideband Code-Division Multiple Access (wideband CDMA, WCDMA), or may be an evolved NodeB (English: evolutional Node B, BS or e-NodeB for short) in the Long Term Evolution (LTE), or may be a base station in a later evolved network, which is not limited in the present invention.

The embodiments are applied to a scenario in which user equipment performs random access to multiple base stations in a communications system. During the random access, the user equipment UE sends preambles to the base stations, and the base stations acquire timing advance TA for initial uplink sending according to the preambles sent by the user equipment, where timing advance, used by the user equipment in different cells, for uplink sending may be the same or may be different. A set of multiple cells that use same timing advance for uplink sending is referred to as a timing advance group (TAG), and the cells in the timing advance group TAG belong to a same base station. Different timing advance groups may belong to a same base station or may belong to different base stations. A cell that is initially accessed by the user equipment is referred to as a primary cell (PCell) of the user equipment, another cell is referred to as a secondary cell (SCell), a timing advance group including a primary cell is referred to as a primary timing advance group (PTAG), and another timing advance group is referred to as a secondary timing advance group (STAG). After the user equipment successfully accesses a primary cell, the base stations configure a secondary cell for the user equipment. For one user equipment, only one primary cell is configured, but multiple secondary cells may be configured. After random access to any timing advance group is successful and valid timing advance is obtained, data in all logical channels of a base station to which the timing advance group belongs can be transmitted by using cells in the timing advance group and the user equipment. For a logical channel, provided that there is successful random access to a base station to which the logical channel belongs, data transmission can be performed.

Specifically, an embodiment provides a communications system. Referring to FIG. 1, the communications system includes at least two base stations (a first base station BS1 and a second base station BS2) and at least one user equipment UE31, where the first base station BS1, the second base station BS2, and the user equipment UE31 (the first base station BS1 and the second base station BS2 simultaneously provide random access services to user equipment UE31 to UE3*k*) constitute the communications system, the first base station is a base station to which cells in a PTAG of the user equipment UE31 belong, and the second base station is a base station to which cells in at least one STAG of the user equipment UE31 belong.

Figure 2:
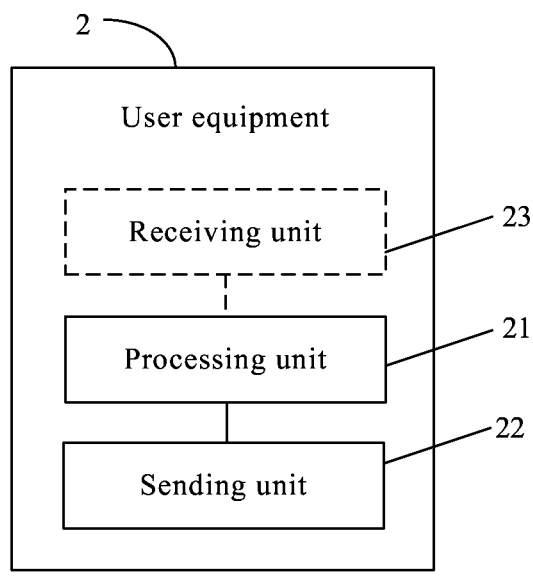
FIG. 2 is a schematic structural diagram of user equipment according to an embodiment.

Referring to FIG. 2, user equipment (which may serve as UE31 to UE3*k* shown in FIG. 1) is provided and is applied to the communications system provided in FIG. 1, and the user equipment 2 includes a processing unit 21 and a sending unit 22.

The processing unit 21 is configured to acquire a first preamble and a second preamble, where the first preamble corresponds to a cell set of a primary timing advance group PTAG of a first base station BS1, and the second preamble corresponds to a cell set of a secondary timing advance group STAG of a second base station BS2.

The sending unit 22 is configured to send the first preamble acquired by the processing unit 21 to the first base station BS1.

The processing unit 21 is further configured to initiate random access to the first base station BS1 according to the first preamble.

The sending unit 22 is further configured to send the second preamble acquired by the processing unit 21 to the second base station BS2.

The processing unit 21 is further configured to initiate random access to the second base station BS2 according to the second preamble.

Further, referring to FIG. 2, the user equipment 2 further includes a receiving unit 23, where the receiving unit 23 is configured to acquire a first channel resource, where the first channel resource is a physical random access channel PRACH resource of the first base station, and the first channel resource includes a subframe set that is to be used to carry the first preamble.

The receiving unit 23 is further configured to acquire a second channel resource, where the second channel resource is a physical random access channel resource of the second base station, and the second channel resource includes a subframe set that is to be used to carry the second preamble.

Optionally, the receiving unit 23 is specifically configured to receive, by using a system broadcast message, the first channel resource sent by the first base station BS1; and the receiving unit 23 is specifically configured to receive, by using dedicated signaling, the second channel resource sent by the second base station BS2, where the subframe set that is to be used to carry the first preamble and that is in the first channel resource and the subframe set that is to be used to carry the second preamble and that is in the second channel resource are in different timeslots.

In this embodiment, when the second channel resource is used only by the user equipment 2 to carry the second preamble, the second base station sends the second channel resource to the user equipment 2 by using dedicated signaling instead of system broadcast, thereby avoiding searching for system broadcast by the user equipment and reducing energy consumption of the user equipment.

Figure 3:
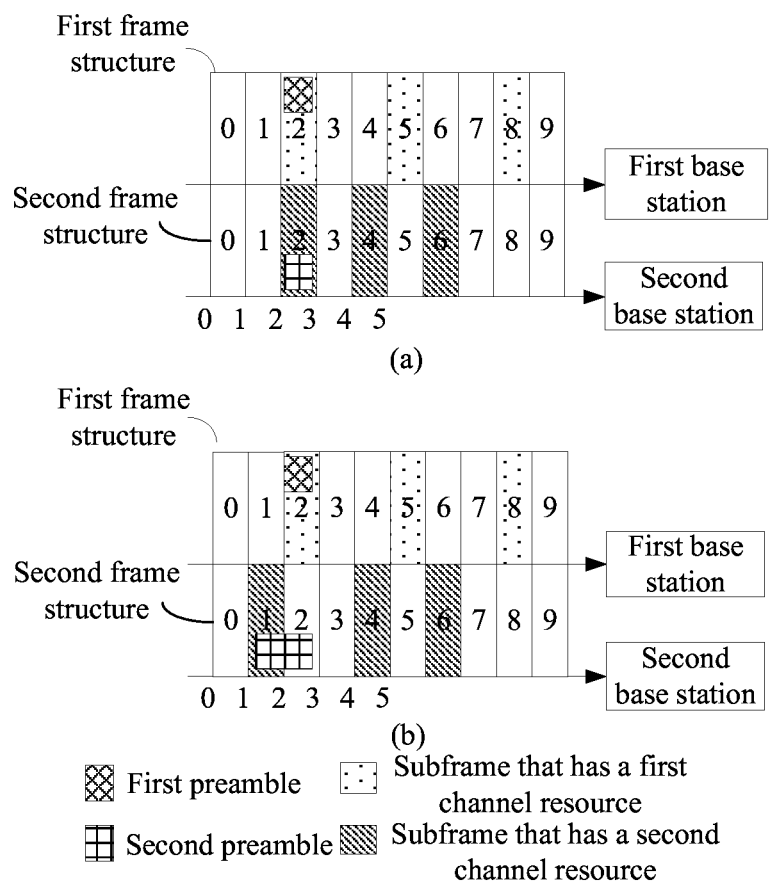
FIG. 3 is a schematic diagram of a principle of a data transmission method according to an embodiment.

Optionally, as shown in FIG. 3, the processing unit 21 is further specifically configured to determine a subframe that carries the first preamble and that is in the first channel resource and a subframe that carries the second preamble and that is in the second channel resource, and determine that a sending time of the first preamble does not overlap with a sending time of the second preamble. Specifically, the user equipment sends the first preamble to the first base station BS1 by using a first frame structure, and sends the second preamble to the second base station BS2 by using a second frame structure.

The sending unit 23 is specifically configured to send the first preamble to the first base station in the subframe that carries the first preamble and that is determined by the processing unit 21; and the sending unit 23 is specifically configured to send the second preamble to the second base station in the subframe that carries the second preamble and that is determined by the processing unit 21.

Referring to FIG. 3(a) or FIG. 3(b), in a first frame structure, a subframe 2, a subframe 5, and a subframe 8 are subframes that have the first channel resource, and the subframe 2 is an earliest subframe that has the first channel resource. In a second frame structure, a subframe 2, a subframe 4, and a subframe 6 are subframes that have the second channel resource, and the subframe 2 is an earliest subframe that has the second channel resource.

For a case in which a sending time of the first preamble overlaps with a sending time of the second preamble, the following two scenarios are specifically included.

Scenario 1: A first subframe that has the first channel resource and that is in the first frame structure and a first subframe that has the second channel resource and that is in the second frame structure are in a same timeslot. As shown in FIG. 3(a), the first preamble is to be sent in the subframe 2 in the first frame structure, and the second preamble is to be sent in the subframe 2 in the second frame structure. In this case, a sending time of the first preamble in the subframe 2 in the first frame structure is 2 to 3, and a sending time of the second preamble in the subframe 2 in the second frame structure is 2 to 3.

Scenario 2: A first subframe that has the first channel resource and that is in the first frame structure and a first subframe that has the second channel resource and that is in the second frame structure are in different timeslots, but a preamble occupies more than one subframe, and the occupied subframes and a subframe in which another preamble is to be sent are in a same timeslot. As shown in FIG. 3(b), the first preamble is to be sent in the subframe 2 in the first frame structure, and the second preamble is to be sent in a subframe 1 in the second frame structure and occupies the subframe 2 in the second frame structure. In this case, a sending time of the first preamble in the subframe 2 in the first frame structure is 2 to 3, and a sending time of the second preamble in the subframe 1 in the second frame structure is 1 to 3.

Another scenario is that the sending time of the first preamble does not overlap with the sending time of the second preamble.

Optionally, when a sending time of the first preamble overlaps with a sending time of the second preamble, the processing unit 21 postpones, to another subframe, a time for sending one preamble of the first preamble and the second preamble.

Specifically, the processing unit 21 postpones, to another subframe, the time for sending the first preamble to the first base station, so that a sending time of the first preamble does not overlap with the sending time of the second preamble. As shown in FIG. 3(a), when both the first preamble and the second preamble are to be sent in the subframe 2, the time for sending the first preamble may be postponed to the subframe 5 or the subframe 8, where a delay of sending the first preamble after the time for sending the first preamble is postponed to the subframe 5 is shorter than a delay of sending the first preamble after the time for sending the first preamble is postponed to the subframe 8; or the processing unit 21 postpones, to another subframe, the time for sending the second preamble to the second base station, so that the sending time of the first preamble does not overlap with a sending time of the second preamble. As shown in FIG. 3(a), when both the first preamble and the second preamble are to be sent in the subframe 2, the time for sending the second preamble may be postponed to the subframe 4 or the subframe 6, where a delay of sending the second preamble after the time for sending the second preamble is postponed to the subframe 4 is shorter than a delay of sending the second preamble after the time for sending the second preamble is postponed to the subframe 6; or when the first preamble is a public preamble, the processing unit 21 postpones, to another subframe, the time for sending the first preamble corresponding to contention-based random access to the first base station, so that a sending time of the first preamble does not overlap with the sending time of the second preamble. As shown in FIG. 3(a), when both the first preamble and the second preamble are to be sent in the subframe 2, the time for sending the first preamble may be postponed to the subframe 5 or the subframe 8, where a delay of sending the first preamble after the time for sending the first preamble is postponed to the subframe 5 is shorter than a delay of sending the first preamble after the time for sending the first preamble is postponed to the subframe 8; or when the second preamble is a public preamble, the processing unit 21 postpones, to another subframe, the time for sending the second preamble corresponding to contention-based random access to the second base station, so that the sending time of the first preamble does not overlap with a sending time of the second preamble. As shown in FIG. 3(a), when both the first preamble and the second preamble are to be sent in the subframe 2, the time for sending the second preamble may be postponed to the subframe 4 or the subframe 6, where a delay of sending the second preamble after the time for sending the second preamble is postponed to the subframe 4 is shorter than a delay of sending the second preamble after the time for sending the second preamble is postponed to the subframe 6; or when a time indicating a next subframe of a subframe that is to be used to carry the first preamble and that is in the first channel resource is earlier than a time indicating a next subframe of a subframe that is to be used to carry the second preamble and that is in the second channel resource, the processing unit 21 postpones, to another subframe, the time for sending the first preamble to the first base station, so that a sending time of the first preamble does not overlap with the sending time of the second preamble; or when a time indicating a next subframe of a subframe that is to be used to carry the second preamble and that is in the second channel resource is earlier than a time indicating a next subframe of a subframe that is to be used to carry the first preamble and that is in the first channel resource, the processing unit 21 postpones, to another subframe, the time for sending the second preamble to the second base station, so that the sending time of the first preamble does not overlap with a sending time of the second preamble. Specifically, as shown in FIG. 3(a), when a next subframe of a subframe that is to be used to carry the first preamble is the subframe 5 in the first frame structure, and a next subframe of a subframe that is to be used to carry the second preamble is the subframe 4 in the second frame structure, the time for sending the second preamble is postponed to the subframe 4. In this case, a delay of sending the second preamble after the time for sending the second preamble is postponed is shorter than a delay of sending the first preamble after the time for sending the first preamble is postponed; or As shown in FIG. 3(b), when a preamble occupies more than one subframe, and the occupied subframes and a subframe in which another preamble is to be sent are in a same timeslot, the processing unit 21 postpones a time for sending a preamble to be sent in a later subframe. Specifically, as shown in FIG. 3(b), the second preamble is to be sent in a subframe 1, and the first preamble is to be sent in the subframe 2, the time for sending the first preamble is postponed to the subframe 5.

Further, when a sending time of a message 3 corresponding to the first preamble overlaps with a sending time of the second preamble: the processing unit 21 is specifically configured to postpone, to another subframe, the time for sending the message 3 corresponding to the first preamble to the first base station, so that a sending time of the message 3 corresponding to the first preamble does not overlap with the sending time of the second preamble; or the processing unit 21 is specifically configured to adjust transmit power of a subframe that carries the message 3 corresponding to the first preamble, where a sum of adjusted transmit power of the subframe that carries the message 3 corresponding to the first preamble and transmit power of a subframe that carries the second preamble and that is in the second channel resource is less than or equal to maximum transmit power of the user equipment, or the processing unit 21 is specifically configured to cancel sending of the message 3, where the message 3 corresponds to the first preamble; and when a sending time of a message 3 corresponding to the second preamble overlaps with a sending time of the first preamble: the processing unit 21 is specifically configured to postpone, to another subframe, the time for sending the message 3 corresponding to the second preamble to the second base station, so that a sending time of the message 3 corresponding to the second preamble does not overlap with the sending time of the first preamble; or the processing unit 21 is specifically configured to adjust transmit power of a subframe that carries the message 3 corresponding to the second preamble, where a sum of adjusted transmit power of the subframe that carries the message 3 corresponding to the second preamble and transmit power of a subframe that carries the first preamble and that is in the first channel resource is less than or equal to maximum transmit power of the user equipment; or the processing unit 21 is specifically configured to cancel sending of the message 3, where the message 3 corresponds to the second preamble.

Further, the sending unit 22 simultaneously sends the first preamble acquired by the processing unit 21 to the first base station BS1 and the second preamble acquired by the processing unit 21 to the second base station BS2; or the sending unit 22 is specifically configured to: during a process in which the user equipment 2 performs random access to the first base station BS1, send the second preamble acquired by the processing unit 21 to the second base station BS2; or the sending unit 22 is specifically configured to: during a process in which the user equipment 2 performs random access to the second base station BS2, send the first preamble acquired by the processing unit 21 to the first base station BS1.

The user equipment provided in this embodiment sends, to multiple base stations, preambles that are used for random access, so as to implement that the user equipment initiates parallel random access to the multiple base stations, thereby reducing delays of the random access of the user equipment to the multiple base stations, and speeding up processes of the random access of the user equipment to the multiple base stations.

Figure 4:
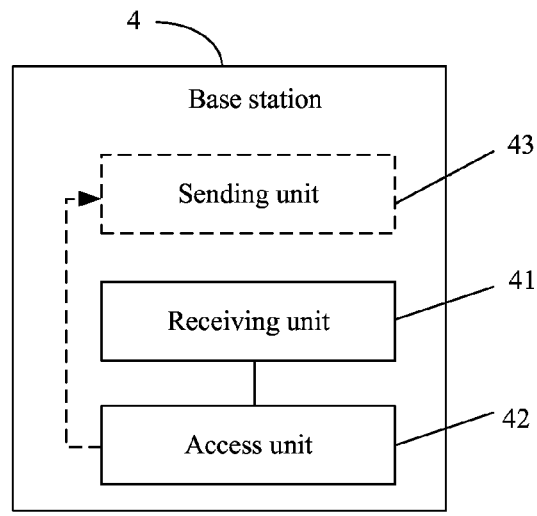
FIG. 4 is a schematic structural diagram of a base station device according to an embodiment.

Referring to FIG. 4, a base station 4 according to an embodiment is applied to the first base station BS1 and the second base station BS2 in the communications system provided in FIG. 1. Structures of the first base station BS1 and the second base station BS2 may be the same, and the first base station BS1 and the second base station BS2 separately include a receiving unit 41 and an access unit 42.

The receiving unit 41 of a first base station BS1 is configured to receive a first preamble sent by user equipment, where the first preamble corresponds to a cell set of a primary timing advance group PTAG of the first base station BS1.

The access unit 42 is configured to: during a process in which the user equipment performs random access to a second base station BS2, perform random access for the user equipment according to the first preamble received by the receiving unit 41.

A second preamble that is required for the user equipment to perform the random access to the second base station corresponds to a cell set of a secondary timing advance group STAG of the second base station.

Further, the access unit 42 is further configured to configure a first channel resource for the user equipment, where the first channel resource is a physical random access channel PRACH resource of the base station, and the first channel resource includes a subframe set that is to be used to carry the first preamble.

Optionally, referring to FIG. 4, the base station 4 further includes a sending unit 43, where the sending unit 43 is configured to send system broadcast or dedicated signaling to the user equipment, where the system broadcast includes the first channel resource configured by the access unit 42; and a subframe set that is to be used to carry the second preamble and that is in a second channel resource and the subframe set that is to be used to carry the first preamble and that is in the first channel resource are in different timeslots, where the subframe sets are acquired by the user equipment.

Optionally, the receiving unit 41 of the first base station is further configured to receive a second channel resource sent by the second base station; and the access unit 42 is further configured to configure the first channel resource for the user equipment according to the second channel resource received by the receiving unit 41.

In this case, when the base station configures a channel resource, that subframes of the first channel resource and the second channel resource are in a same timeslot can be avoided, and a case in which the user equipment sets the first preamble and the second preamble in subframes with a same timeslot can be avoided, which may reduce workload of the user equipment.

Optionally, the receiving unit 41 of the first base station is further configured to receive a second channel resource sent by the second base station; and the sending unit 43 is further configured to send, to the user equipment, a channel resource that does not overlap with the second channel resource received by the receiving unit 41 and that is in the first channel resource, where a subframe set that is to be used to carry the first preamble and that is in the channel resource that does not overlap with the second channel resource and is in the first channel resource and a subframe set that is to be used to carry the second preamble and that is in the second channel resource are in different timeslots.

The second channel resource is sent to the user equipment by using dedicated signaling, and therefore, a subframe included in the second channel resource may be adjusted according to the first channel resource without considering impact thereof on another user equipment.

The base station provided in this embodiment of the present invention can implement simultaneous random access of user equipment to multiple base stations by including a preamble used by the user equipment to initiate random access to the base station, thereby reducing delays of the random access of the user equipment to the multiple base stations, and speeding up processes of the random access of the user equipment to the multiple base stations.

Figure 5:
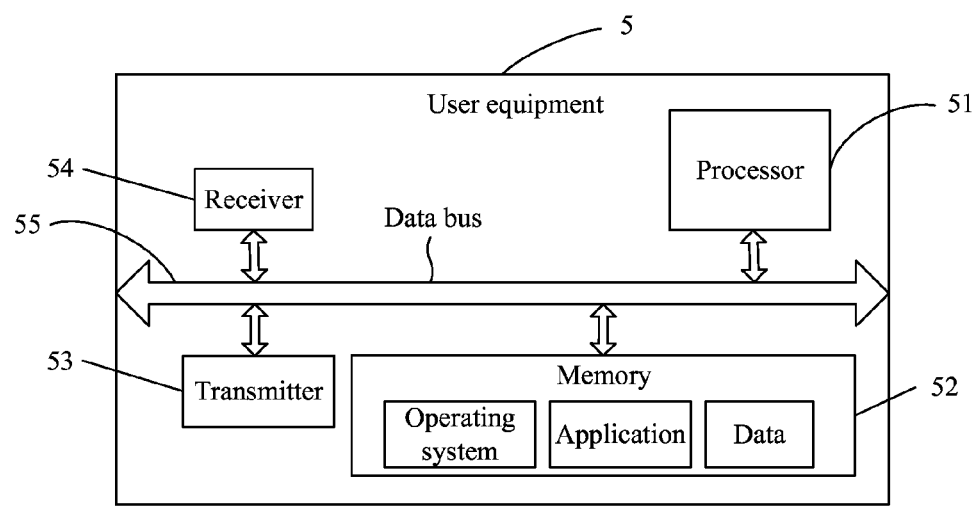
FIG. 5 is a schematic structural diagram of a base station device according to another embodiment.

Referring to FIG. 5, an embodiment of the present invention further provides user equipment 5, which is applied to the communications system provided in the foregoing embodiments, and specifically includes a processor 51, a memory 52, a transmitter 53, a receiver 54, and a data bus 55, where the data bus 55 is configured to implement connection and communication among the processor 51, the memory 52, the receiver 54, and the transmitter 53.

The data bus 55 may be an industry standard architecture (Industry Standard Architecture, ISA) bus, a peripheral component interconnect (Peripheral Component, PCI) bus, or an extended industry standard architecture (Extended Industry Standard Architecture, EISA) bus, or the like. The bus 55 may be classified into an address bus, a data bus, a control bus, and the like, which, for ease of representation, is represented by using only a thick line with arrows in FIG. 5, but it does not mean that there is only one bus or one type of bus.

The memory 52 is configured to store data or executable program code, where the program code includes a computer operation instruction, and may specifically be an operating system, an application program, and the like. The memory 52 may include a high speed RAM memory, and may also include a non-volatile memory (non-volatile memory), for example, at least one magnetic disk memory.

The processor 51 may be a central processing unit (Central Processing Unit, CPU), or an application-specific integrated circuit (Application Specific Integrated Circuit, ASIC), or may be configured as one or more integrated circuits for implementing this embodiment of the present invention.

The transmitter 53 and the receiver 54 are mainly configured to implement communication between devices in this embodiment.

The processor 51 is configured to acquire a first preamble and a second preamble by using the receiver 54, where the first preamble corresponds to a cell set of a primary timing advance group PTAG of a first base station, and the second preamble corresponds to a cell set of a secondary timing advance group STAG of a second base station; the processor 51 is further configured to send the first preamble to the first base station by using the transmitter 53, to initiate random access to the first base station according to the first preamble; and the processor 51 is further configured to send the second preamble to the second base station by using the transmitter 53, to initiate random access to the second base station according to the second preamble.

Optionally, the processor 51 is further configured to acquire a first channel resource by using the receiver 54, where the first channel resource is a physical random access channel PRACH resource of the first base station, and the first channel resource includes a subframe set that is to be used to carry the first preamble; and the processor 51 is further configured to acquire a second channel resource by using the receiver 54, where the second channel resource is a physical random access channel PRACH resource of the second base station, and the second channel resource includes a subframe set that is to be used to carry the second preamble.

Further, the processor 51 is further configured to receive, by using a system broadcast message received by the receiver 54, the first channel resource sent by the first base station; and the processor 51 is further configured to receive, by using dedicated signaling received by the receiver 54, the second channel resource sent by the second base station, where the subframe set that is to be used to carry the first preamble and that is in the first channel resource and the subframe set that is to be used to carry the second preamble and that is in the second channel resource are in different timeslots.

Optionally, the processor 51 is further configured to: determine a subframe that carries the first preamble and that is in the first channel resource and a subframe that carries the second preamble and that is in the second channel resource, and determine that a sending time of the first preamble does not overlap with a sending time of the second preamble; the processor 51 is further configured to send, by using the transmitter 53, the first preamble to the first base station in the subframe that carries the first preamble; and the processor 51 is further configured to send, by using the transmitter 53, the second preamble to the second base station in the subframe that carries the second preamble.

Further, when the sending time of the first preamble overlaps with the sending time of the second preamble: the processor 51 is further configured to postpone, to another subframe, the time for sending the first preamble to the first base station, so that a sending time of the first preamble does not overlap with the sending time of the second preamble; or the processor 51 is further configured to postpone, to another subframe, the time for sending the second preamble to the second base station, so that the sending time of the first preamble does not overlap with a sending time of the second preamble; or when the first preamble is a public preamble, the processor 51 is further configured to postpone, to another subframe, the time for sending the first preamble corresponding to contention-based random access to the first base station, so that a sending time of the first preamble does not overlap with the sending time of the second preamble; or when the second preamble is a public preamble, the processor 51 is further configured to postpone, to another subframe, the time for sending the second preamble corresponding to contention-based random access to the second base station, so that the sending time of the first preamble does not overlap with a sending time of the second preamble; or when a time indicating a next subframe of a subframe that is to be used to carry the first preamble and that is in the first channel resource is earlier than a time indicating a next subframe of a subframe that is to be used to carry the second preamble and that is in the second channel resource, the processor 51 is further configured to postpone, to another subframe, the time for sending the first preamble to the first base station, so that a sending time of the first preamble does not overlap with the sending time of the second preamble; or when a time indicating a next subframe of a subframe that is to be used to carry the second preamble and that is in the second channel resource is earlier than a time indicating a next subframe of a subframe that is to be used to carry the first preamble and that is in the first channel resource, the processor 51 is further configured to postpone, to another subframe, the time for sending the second preamble to the second base station, so that the sending time of the first preamble does not overlap with a sending time of the second preamble; or when a case in which overlap occurs between sending times is shown in FIG. 3(*b*), a preamble occupies more than one subframe, and the occupied subframes and a subframe in which another preamble is to be sent are in a same timeslot, the processor 51 postpones a time for sending a preamble to be sent in a later subframe.

Optionally, the processor 51 is specifically configured to select a subframe that carries the first preamble and that is in the first channel resource and a subframe that carries the second preamble and that is in the second channel resource, where a sum of transmit power of the subframe that carries the first preamble and transmit power of the subframe that carries the second preamble is less than or equal to maximum transmit power of the user equipment; the processor 51 is further configured to send, by using the transmitter 53, the first preamble to the first base station in the subframe that carries the first preamble; and the processor 51 is further configured to send, by using the transmitter 53, the second preamble to the second base station in the subframe that carries the second preamble.

Optionally, when a sending time of a message 3 corresponding to the first preamble overlaps with a sending time of the second preamble: the processor 51 is specifically configured to postpone, to another subframe, the time for sending the message 3 corresponding to the first preamble to the first base station, so that a sending time of the message 3 corresponding to the first preamble does not overlap with the sending time of the second preamble; or the processor 51 is specifically configured to adjust transmit power of a subframe that carries the message 3 corresponding to the first preamble, where a sum of adjusted transmit power of the subframe that carries the message 3 corresponding to the first preamble and transmit power of a subframe that carries the second preamble and that is in the second channel resource is less than or equal to maximum transmit power of the user equipment; or the processor 51 is specifically configured to cancel sending of the message 3, where the message 3 corresponds to the first preamble; and when a sending time of a message 3 corresponding to the second preamble overlaps with a sending time of the first preamble: the processor 51 is specifically configured to postpone, to another subframe, the time for sending the message 3 corresponding to the second preamble to the second base station, so that a sending time of the message 3 corresponding to the second preamble does not overlap with the sending time of the first preamble; or the processor 51 is specifically configured to adjust transmit power of a subframe that carries the message 3 corresponding to the second preamble, where a sum of adjusted transmit power of the subframe that carries the message 3 corresponding to the second preamble and transmit power of a subframe that carries the first preamble and that is in the first channel resource is less than or equal to maximum transmit power of the user equipment; or the processor 51 is specifically configured to cancel sending of the message 3, where the message 3 corresponds to the second preamble.

Further, optionally, the processor 51 is specifically configured to simultaneously send, by using the transmitter 53, the first preamble to the first base station and the second preamble to the second base station; or the processor 51 is specifically configured to: during a process in which the user equipment performs random access to the first base station, send the second preamble to the second base station by using the transmitter 53; or the processor 51 is specifically configured to: during a process in which the user equipment performs random access to the second base station, send the first preamble to the first base station by using the transmitter 53.

The user equipment provided in this embodiment simultaneously sends, to multiple base stations, preambles that are used for random access, so as to implement that the user equipment simultaneously initiates parallel random access to the multiple base stations, thereby reducing delays of the random access of the user equipment to the multiple base stations, and speeding up processes of the random access of the user equipment to the multiple base stations.

An embodiment further provides a base station 6, which is applied to the base station (referring to the first base station BS1 and the second base station BS2 in FIG. 1) in the communications system provided in the foregoing embodiments. Structures of the first base station BS1 and the second base station BS2 are completely the same, and the base station 6 specifically includes a processor 61, a memory 62, a receiver 64, and a data bus 65, where the data bus 65 is configured to implement connection and communication among the processor 61, the memory 62, and the receiver 64.

Figure 6:
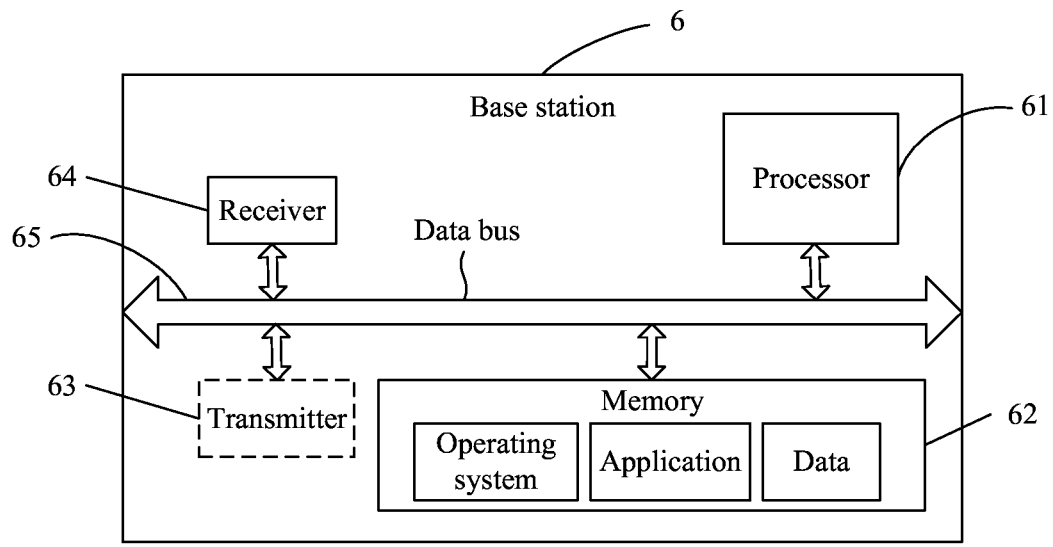
FIG. 6 is a schematic structural diagram of user equipment according to another embodiment of the present invention.

The data bus 65 may be an industry standard architecture (Industry Standard Architecture, ISA) bus, a peripheral component interconnect (Peripheral Component, PCI) bus, or an extended industry standard architecture (Extended Industry Standard Architecture, EISA) bus, or the like. The bus 65 may be classified into an address bus, a data bus, a control bus, and the like, which, for ease of representation, is represented by using only a thick line with arrows in FIG. 6, but it does not mean that there is only one bus or one type of bus.

The memory 62 is configured to store data or executable program code, where the program code includes a computer operation instruction, and may specifically be an operating system, an application program, and the like. The memory 62 may include a high speed RAM memory, and may also include a non-volatile memory, for example, at least one magnetic disk memory.

The processor 61 may be a central processing unit (CPU), or an application-specific integrated circuit (ASIC), or may be configured as one or more integrated circuits for implementing this embodiment of the present invention.

The receiver 64 is mainly configured to implement communication between devices in this embodiment.

The processor 61 is configured to receive, by using the receiver 64, a first preamble sent by user equipment, where the first preamble corresponds to a cell set of a primary timing advance group PTAG of a first base station.

The processor 61 is further configured to: during a process in which the user equipment performs random access to a second base station, perform random access for the user equipment according to the first preamble.

Optionally, the base station 6 further includes a transmitter 63 connected to the data bus 65.

A second preamble that is required for the user equipment to perform random access to the second base station corresponds to a cell set of a secondary timing advance group STAG of the second base station.

Further, the processor 61 is further configured to configure a first channel resource for the user equipment, where the first channel resource is a physical random access channel PRACH resource of the first base station, and the first channel resource includes a subframe set that is to be used to carry the first preamble.

Optionally, the base station 6 further includes a transmitter 63 connected to the data bus 65; and the processor 61 sends system broadcast or dedicated signaling to the user equipment by using the transmitter 63, where the system broadcast includes the first channel resource, where a subframe set that is to be used to carry the second preamble and that is in a second channel resource and the subframe set that is to be used to carry the first preamble and that is in the first channel resource are in different timeslots, where the subframe sets are acquired by the user equipment.

Optionally, the processor 61 of the base station 6 is further configured to receive, by using the receiver 64, the second channel resource sent by the second base station; and the processor 61 of the base station 6 is further configured to configure the first channel resource for the user equipment according to the second channel resource.

Alternatively, the processor 61 of the base station 6 is further configured to receive, by using the receiver 64, the second channel resource sent by the second base station; and the processor 61 of the base station 6 is further configured to send, to the user equipment by using the transmitter 63, a channel resource that does not overlap with the second channel resource and that is in the first channel resource, where a subframe set that is to be used to carry the first preamble and that is in the channel resource that does not overlap with the second channel resource and is in the first channel resource and the subframe set that is to be used to carry the second preamble and that is in the second channel resource are in different timeslots.

The base station provided in this embodiment can implement simultaneous random access of user equipment to multiple base stations by acquiring a preamble used by the user equipment to initiate random access to the base station, thereby reducing delays of the random access of the user equipment to the multiple base stations, and speeding up processes of the random access of the user equipment to the multiple base stations.

Figure 7:
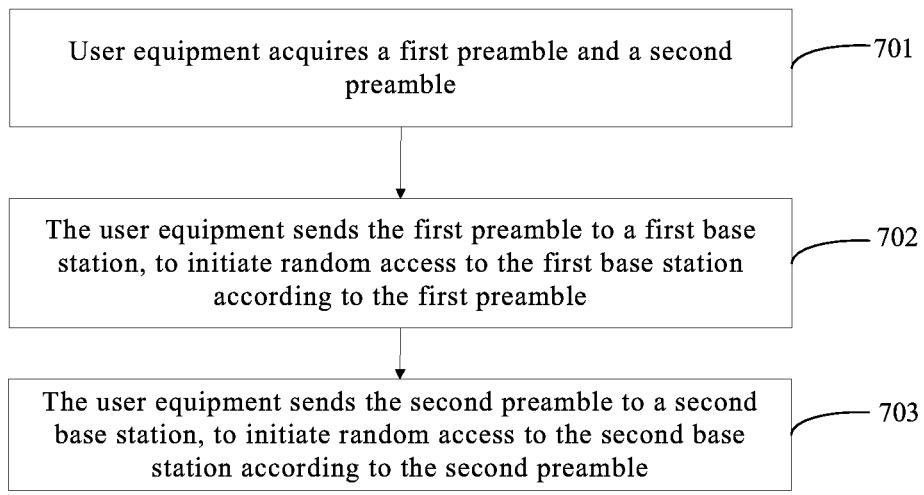
FIG. 7 is a schematic flowchart of a data transmission method according to an embodiment.

Referring to FIG. 7, an embodiment provides a data transmission method, which is applied to the user equipment provided in the apparatus embodiments, and specifically includes the following steps.

701. User equipment acquires a first preamble and a second preamble, where the first preamble corresponds to a cell set of a primary timing advance group PTAG of a first base station, and the second preamble corresponds to a cell set of a secondary timing advance group STAG of a second base station.

702. The user equipment sends the first preamble to the first base station, to initiate random access to the first base station according to the first preamble.

703. The user equipment sends the second preamble to the second base station, to initiate random access to the second base station according to the second preamble.

There is no time sequence between step 702 and step 703. Step 703 is performed during a process of performing step 702, step 702 may be performed during a process of performing step 703, or step 702 and step 703 may be simultaneously executed.

Further, before step 701, the method further includes the following steps.

701*a*. The user equipment acquires a first channel resource, where the first channel resource is a physical random access channel PRACH resource of the first base station, and the first channel resource includes a subframe set that is to be used to carry the first preamble.

That the user equipment acquires a first channel resource specifically includes: the user equipment receives, by using a system broadcast message, the first channel resource sent by the first base station.

701*b*. The user equipment acquires a second channel resource, where the second channel resource is a physical random access channel resource of the second base station, and the second channel resource includes a subframe set that is to be used to carry the second preamble.

That the user equipment acquires a second channel resource specifically includes: the user equipment receives, by using dedicated signaling, the second channel resource sent by the second base station.

According to the data transmission method provided in this embodiment, user equipment simultaneously sends, to multiple base stations, preambles that are used for random access, so as to implement that the user equipment simultaneously initiates parallel random access to the multiple base stations, thereby reducing delays of the random access of the user equipment to the multiple base stations, and speeding up processes of the random access of the user equipment to the multiple base stations.

Figure 8:
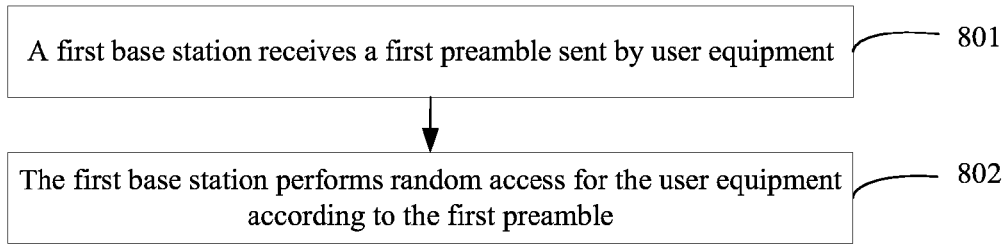
FIG. 8 is a schematic flowchart of another data transmission method according to an embodiment of the present invention.

Referring to FIG. 8, an embodiment provides another data transmission method, which is applied to the base stations provided in the apparatus embodiments, where functions of a first base station and a second base station may be the same, the first base station and the second base station are used herein for differentiation only, and the method specifically includes the following steps.

801. A first base station receives a first preamble sent by user equipment.

The first preamble corresponds to a cell set of a primary timing advance group PTAG of the first base station.

During a process in which the user equipment performs random access to a second base station:

802. The first base station performs random access for the user equipment according to the first preamble.

A second preamble that is required for the user equipment to perform the random access to the second base station corresponds to a cell set of a secondary timing advance group STAG of the second base station.

Further, before step 801, the method further includes configuring, by the first base station, a first channel resource, where the first channel resource is a physical random access channel PRACH resource of the first base station, and the first channel resource includes a subframe set that is to be used to carry the first preamble; and sending, by a base station, system broadcast or dedicated signaling to the user equipment, where the system broadcast includes the first channel resource.

Specifically, when the base station is the first base station, the base station sends the system broadcast including the first channel resource; and when the base station is the second base station, the base station sends dedicated signaling including a second channel resource to the user equipment.

According to the data transmission method provided in this embodiment, a base station can implement simultaneous random access of user equipment to multiple base stations by using a preamble used by the user equipment to initiate random access to the base station, thereby reducing delays of the random access of the user equipment to the multiple base stations, and speeding up processes of the random access of the user equipment to the multiple base stations.

Figure 9:
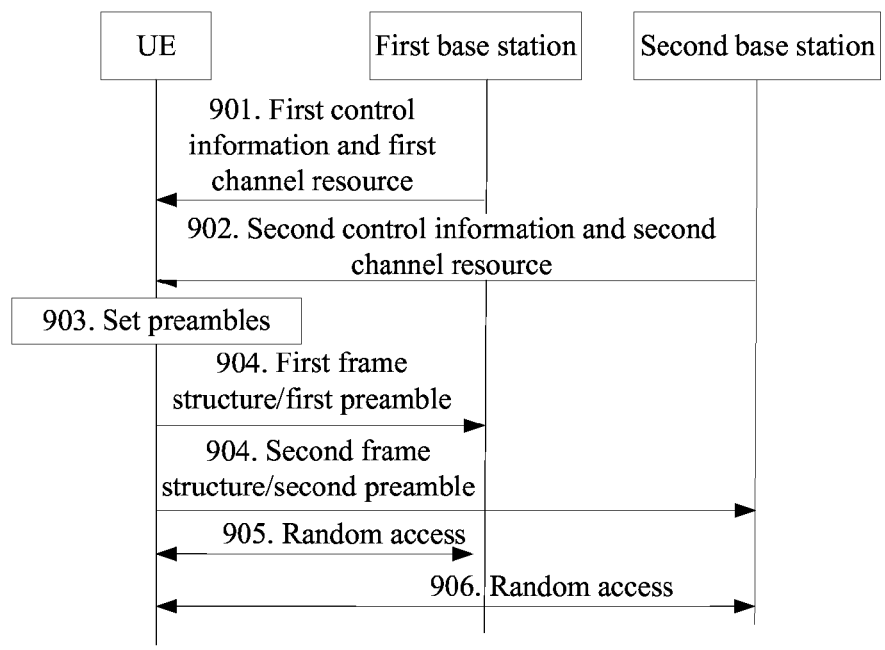
FIG. 9 is a schematic diagram of signaling exchange of a data transmission method according to another embodiment.

Specifically, referring to FIG. 9, when user equipment needs to simultaneously perform data service transmission with multiple base stations, a diagram of signaling exchange during which the user equipment initiates random access to the base stations is provided, where a first base station serves at least one cell in a primary timing advance group PTAG used by the user equipment to transmit data by means of carrier aggregation, and a second base station serves at least one cell in a secondary timing advance group STAG used by the user equipment to transmit data by means of carrier aggregation. When the user equipment needs to perform data service transmission with the first base station and the second base station, the user equipment sets a preamble that is used to initiate random access to the first base station in a first frame structure, sets a preamble that is used to initiate random access to the second base station in a second frame structure, and simultaneously sends the first frame structure and the second frame structure, where the first frame structure is sent to the first base station, and the second frame structure is sent to the second base station.

The first base station processes the random access of the user equipment according to the preamble of the cell in the primary timing advance group PTAG, and the second base station processes the random access of the user equipment according to the preamble of the cell in the secondary timing advance group STAG.

Specifically, the following steps are included.

901. The first base station sends system broadcast including a first channel resource and sends first control information.

The first channel resource is a PRACH resource of the first base station, and the first control information includes a public preamble indication parameter or a dedicated preamble indication parameter. The user equipment generates a first public preamble according to the public preamble indication parameter and the first channel resource of the first base station, or generates a first dedicated preamble according to the dedicated preamble indication parameter and the first channel resource of the first base station.

902. The second base station sends dedicated signaling including a second channel resource and sends second control information.

The second channel resource is a PRACH resource of the second base station, and the second control information includes a public preamble indication parameter or a dedicated preamble indication parameter. The user equipment generates a second public preamble according to the public preamble indication parameter and the second channel resource of the second base station, or generates a second dedicated preamble according to the dedicated preamble indication parameter and the second channel resource of the second base station.

903. The user equipment acquires the first channel resource by using the system broadcast of the first base station, and acquires the second channel resource by using the dedicated signaling of the second base station; the user equipment generates a first preamble according to the first control information and the first channel resource of the first base station, and generates a second preamble according to the second control information and the second channel resource of the second base station; and the user equipment allows the first preamble to be sent in the first subframe that has the first channel resource and that is in a first frame structure, and allows the second preamble to be sent in the first subframe that has the second channel resource and that is in a second frame structure.

The channel resources are used to carry the preambles in the subframes in the frame structures.

When the first base station sends the first control information including the dedicated preamble indication parameter to the user equipment, the user equipment generates the first dedicated preamble according to the first channel resource and the dedicated preamble indication parameter that is acquired from the first control information, and prepares to initiate non-contention based random access to the first base station. When the user equipment needs to initiate contention-based random access to the first base station, the first base station sends the first control information including the public preamble indication parameter to the user equipment, and the user equipment generates the first public preamble according to the first channel resource and the public preamble indication parameter that is acquired from the first control information, and prepares to initiate the contention-based random access to the first base station.

When the second base station sends the second control information including the dedicated preamble indication parameter to the user equipment, the user equipment generates the second dedicated preamble according to the second channel resource and the dedicated preamble indication parameter that is acquired from the second control information, and prepares to initiate non-contention based random access to the second base station. When the user equipment needs to initiate contention-based random access to the second base station, the second base station sends the second control information including the public preamble indication parameter to the user equipment, and the user equipment generates the second public preamble according to the second channel resource and the public preamble indication parameter that is acquired from the second control information, and prepares to initiate the contention-based random access to the second base station.

904. The user equipment sends the first frame structure and the second frame structure, where the first frame structure is sent to the first base station, and the second frame structure is sent to the second base station.

905. The first base station receives the first frame structure, and acquires the first preamble in the first frame structure, so that the user equipment performs random access to the first base station according to the first preamble.

906. The second base station receives the second frame structure, and acquires the second preamble in the first frame structure, so that the user equipment performs random access to the base station according to the second preamble.

That the user equipment sets the first preamble in the first frame structure and sets the second preamble in the second frame structure in step 903 specifically includes the following schemes.

Figure 10:
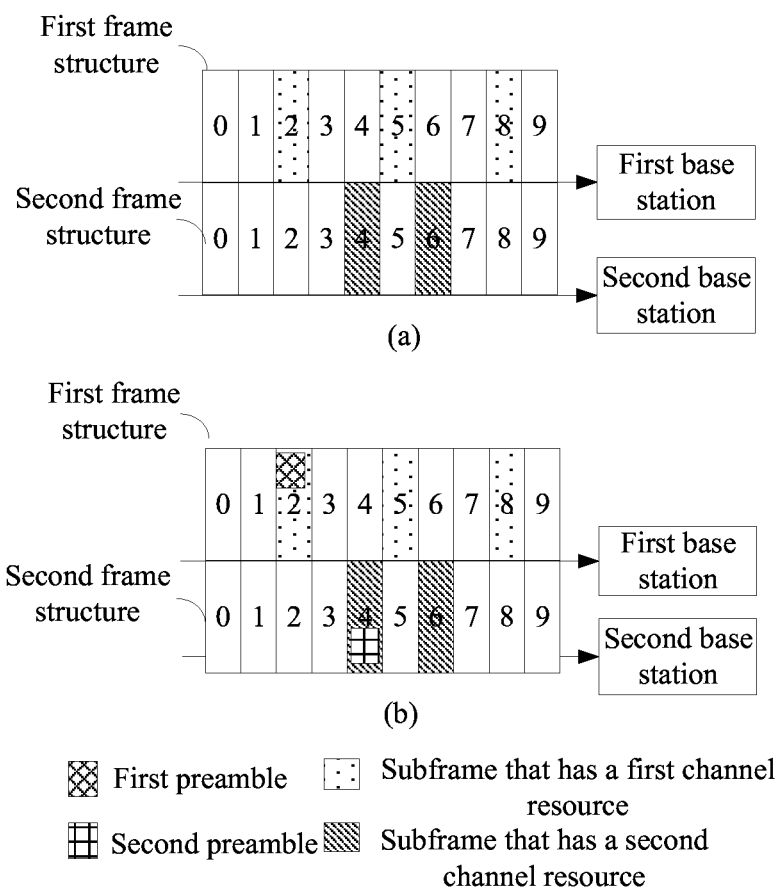
FIG. 10 is a schematic diagram of a principle of a data transmission method according to another embodiment.

Scheme 1: When a sending time in the first subframe that has the first channel resource and that is in the first frame structure does not overlap with a sending time in the first subframe that has the second channel resource and that is in the second frame structure (for a case in which overlap occurs between the sending times, there are two scenarios, and scenario 1 is used as an example herein for description, and for details, refer to the foregoing embodiment, which is not described herein again), the user equipment allows the first preamble to be sent in the first subframe that has the first channel resource and that is in the first frame structure, and allows the second preamble to be sent in the first subframe that has the second channel resource and that is in the second frame structure. As shown in FIG. 10(*a*), subframes that has the first channel resource are a subframe 2, a subframe 5, and a subframe 8 in a first frame structure, and subframes that has the second channel resource are a subframe 4 and a subframe 6 in a second frame structure. In this case, the first subframe that has the first channel resource and that is in the first frame structure is the subframe 2, the first subframe that has the second channel resource and that is in the second frame structure is the subframe 4, and sending times in the subframe 2 in the first frame structure and the subframe 4 in the second frame structure do not overlap. As shown in FIG. 10(*b*), the user equipment allows the first preamble to be sent in the first subframe that has the first channel resource and that is in the first frame structure, that is, the subframe 2 in the first frame structure; and allows the second preamble to be sent in the first subframe that has the second channel resource and that is in the second frame structure, that is, the subframe 4 in the second frame structure.

Figure 11:
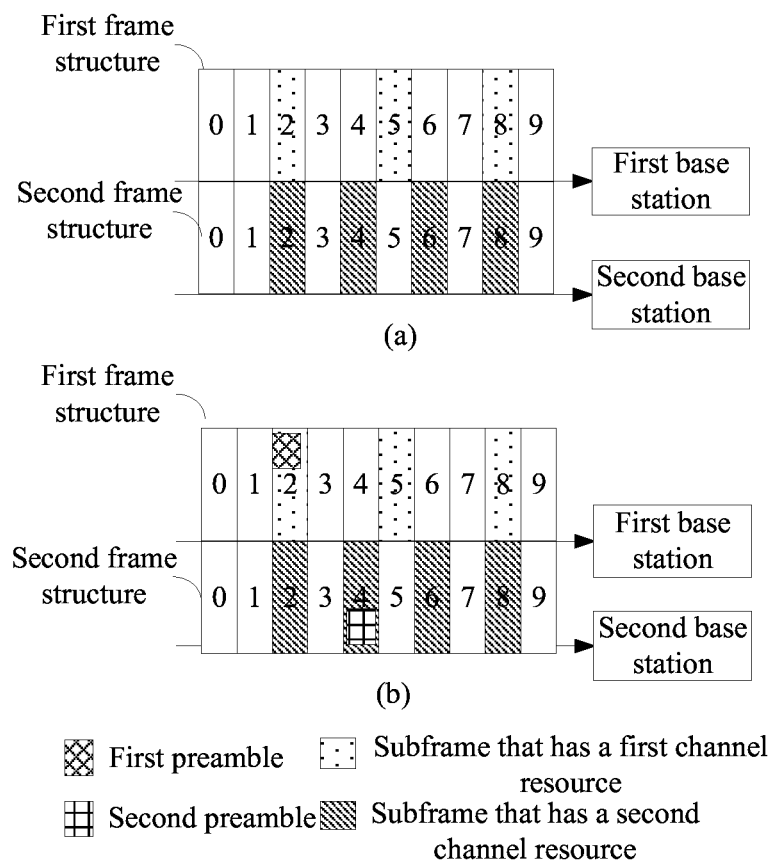
FIG. 11 is a schematic diagram of a principle of another data transmission method according to another embodiment.

Scheme 2: When a sending time in the first subframe that has the first channel resource and that is in the first frame structure overlaps with a sending time in the first subframe that has the second channel resource and that is in the second frame structure, the user equipment selects one of the first preamble and the second preamble, allows the other preamble to be sent in the first subframe that has a channel resource corresponding to the other preamble and that is in a fame structure corresponding to the other preamble, and allows the selected preamble to be sent in a next subframe that has a channel resource corresponding to the selected preamble. Referring to FIG. 11, when the sending time in the first subframe that has the first channel resource and that is in the first frame structure overlaps with the sending time in the first subframe that has the second channel resource and that is in the second frame structure, as shown in FIG. 11(*a*), subframes that has the first channel resource are a subframe 2, a subframe 5, and a subframe 8 in a first frame structure, and subframes that has the second channel resource are a subframe 2, a subframe 4, a subframe 6, and a subframe 8 in a second frame structure. In this case, as shown in FIG. 11(*b*), when a MAC (Medium Access Control, medium access control sublayer) of the user equipment discovers that the first subframe that has the first channel resource and that is in the first frame structure is the subframe 2, and the first subframe that has the second channel resource and that is in the second frame structure is the subframe 2, that is, the first subframe that has the first channel resource and that is in the first frame structure and the first subframe that has the second channel resource and that is in the second frame structure are in a same timeslot, the MAC layer selects one of the first preamble and the second preamble (that the second preamble is selected is used as an example herein for description), allows the first preamble to be sent in the first subframe that has the first channel resource and that is in the first frame structure, that is, the subframe 2 in the first frame structure, and allows the second preamble to be sent in a next subframe that has the second channel resource, that is, the subframe 4 in the second frame structure.

Specifically, the MAC sublayer may select one of the first preamble and the second preamble by using the following methods:

selecting the first preamble, and allowing the second preamble to be sent in a next subframe corresponding to the second channel resource;

selecting the second preamble, and allowing the first preamble to be sent in a next subframe corresponding to the first channel resource;

selecting a dedicated preamble, and allowing a public preamble to be sent in a next subframe corresponding to a channel resource corresponding to the public preamble; and selecting a preamble in a next earlier subframe that has a channel resource, allowing a preamble in a next later subframe that has a channel resource to be sent in the first subframe that has the channel resource corresponding to the preamble.

Figure 12:
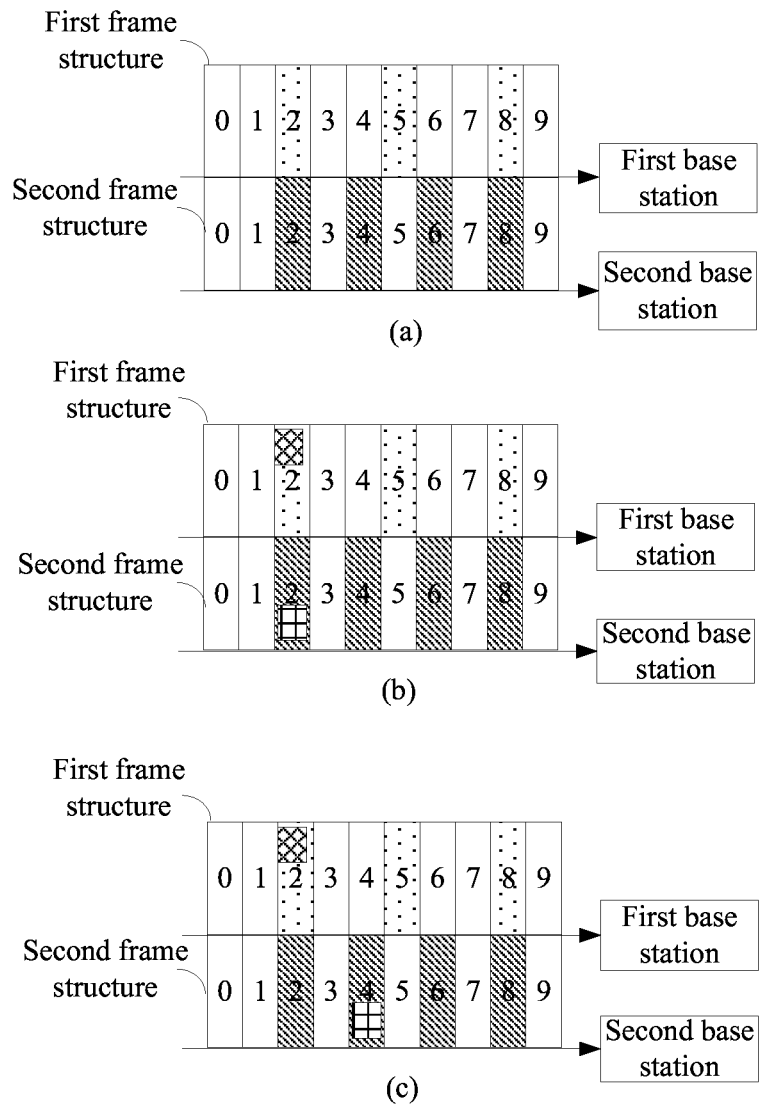
FIG. 12 is a schematic diagram of a principle of still another data transmission method according to another embodiment.

Scheme 3: When a sending time in the first subframe that has the first channel resource and that is in the first frame structure overlaps with a sending time in the first subframe that has the second channel resource and that is in the second frame structure, the user equipment calculates transmit power of the first subframe that has the first channel resource and that is in the first frame structure and the first subframe that has the second channel resource and that is in the second frame structure. When the transmit power of the first subframe that has the first channel resource and that is in the first frame structure and the first subframe that has the second channel resource and that is in the second frame structure are less than or equal to threshold transmit power of the user equipment, the user equipment allows the first preamble to be sent in the first subframe that has the first channel resource and that is in the first frame structure, and allows the second preamble to be sent in the first subframe that has the second channel resource and that is in the second frame structure. When transmit power of subframes including the second preamble and the second preamble are greater than the threshold transmit power of the user equipment, the user equipment selects one of the first preamble and the second preamble, allows the other preamble to be sent in the first subframe that has a channel resource corresponding to the other preamble and that is in a fame structure corresponding to the other preamble, and allows the selected preamble to be sent in a next subframe that has a channel resource corresponding to the selected preamble. As shown in FIG. 12, in FIG. 12(*a*), subframes that have the first channel resource are a subframe 2, a subframe 5, and a subframe 8 in a first frame structure, and subframes that have the second channel resource are a subframe 2, a subframe 4, a subframe 6, and a subframe 8 in a second frame structure. In this case, the first subframe that has the first channel resource and that is in the first frame structure is the subframe 2, and the first subframe that has the second channel resource and that is in the second frame structure is the subframe 2, that is, the first subframe that has the first channel resource and that is in the first frame structure and the first subframe that has the second channel resource and that is in the second frame structure are in a same timeslot. A physical layer of the user equipment calculates transmit power of the first subframe that has the first channel resource and that is in the first frame structure and the first subframe that has the second channel resource and that is in the second frame structure, that is, calculates transmit power of the subframe 2 in the first frame structure and the subframe 2 in the second frame structure.

When the transmit power of the subframe 2 in the first frame structure and the subframe 2 in the second frame structure are less than or equal to the threshold transmit power of the user equipment, as shown in FIG. 12(*b*), a MAC sublayer allows the first preamble to be sent in the first subframe that has the first channel resource and that is in the first frame structure, that is, the subframe 2 in the first frame structure; and allows the second preamble to be sent in the first subframe that has the second channel resource and that is in the second frame structure, that is, the subframe 2 in the second frame structure. When the transmit power of the subframe 2 in the first frame structure and the subframe 2 in the second frame structure are greater than the threshold transmit power of the user equipment, as shown in FIG. 12(*c*), the MAC sublayer selects one of the first preamble and the second preamble (that the second preamble is selected is used herein as an example for description), and the MAC sublayer allows the first preamble to be sent in the first subframe that has the first channel resource and that is in the first frame structure, that is, the subframe 2 in the first frame structure; and allows the second preamble to be sent in a next subframe that has the second channel resource, that is, the subframe 4 in the second frame structure.

Specifically, the MAC sublayer may select one of the first preamble and the second preamble by using the following methods: selecting the second preamble, and allowing the second preamble to be sent in a next subframe corresponding to the second channel resource; selecting the first preamble, and allowing the first preamble to be sent in a next subframe corresponding to the first channel resource; and selecting a dedicated preamble, and allowing a public preamble to be sent in a next subframe corresponding to a channel resource corresponding to the public preamble.

Scheme 4: When a sending time in a subframe in which a channel resource corresponding to either preamble exists overlaps with a sending time in a subframe that has a channel resource occupied by a message 3 corresponding to the other preamble, and when the other preamble is a public preamble, the user equipment calculates transmit power of the subframe that has the channel resource corresponding to the either preamble and the subframe that has the channel resource occupied by the message 3 corresponding to the other preamble, where the message 3 may be a contention resolution identity of the public preamble. When transmit power of the subframe that has the channel resource corresponding to the either preamble and the subframe that has the channel resource occupied by the message 3 corresponding to the other preamble are less than or equal to threshold transmit power of the user equipment, the user equipment allows the either preamble to be sent in the subframe that has the channel resource corresponding to the either preamble, and allows the message 3 corresponding to the other preamble to be sent in the subframe that has the channel resource occupied by the message 3 corresponding to the other preamble.

When the transmit power of the subframe that has the channel resource corresponding to the either preamble and the subframe that has the channel resource occupied by the message 3 corresponding to the other preamble are greater than the threshold transmit power of the user equipment, the user equipment allows the message 3 corresponding to the other preamble to be sent in the subframe that has the channel resource occupied by the message 3 corresponding to the other preamble, and allows the either preamble to be sent in a next subframe that has the channel resource corresponding to the either preamble.

Optionally, the user equipment allows the either preamble to be sent in the subframe that has the channel resource corresponding to the either preamble, allows the message 3 corresponding into the other preamble to be sent in the subframe that has the channel resource occupied by the message 3 corresponding to the other preamble, and after reducing transmit power of the message 3 corresponding to the other preamble, sends the first frame structure to the first base station and sends the second frame structure to the second base station.

Optionally, the user equipment allows only the either preamble to be sent in the subframe in which the channel resource corresponding to the either preamble exists.

Figure 13:
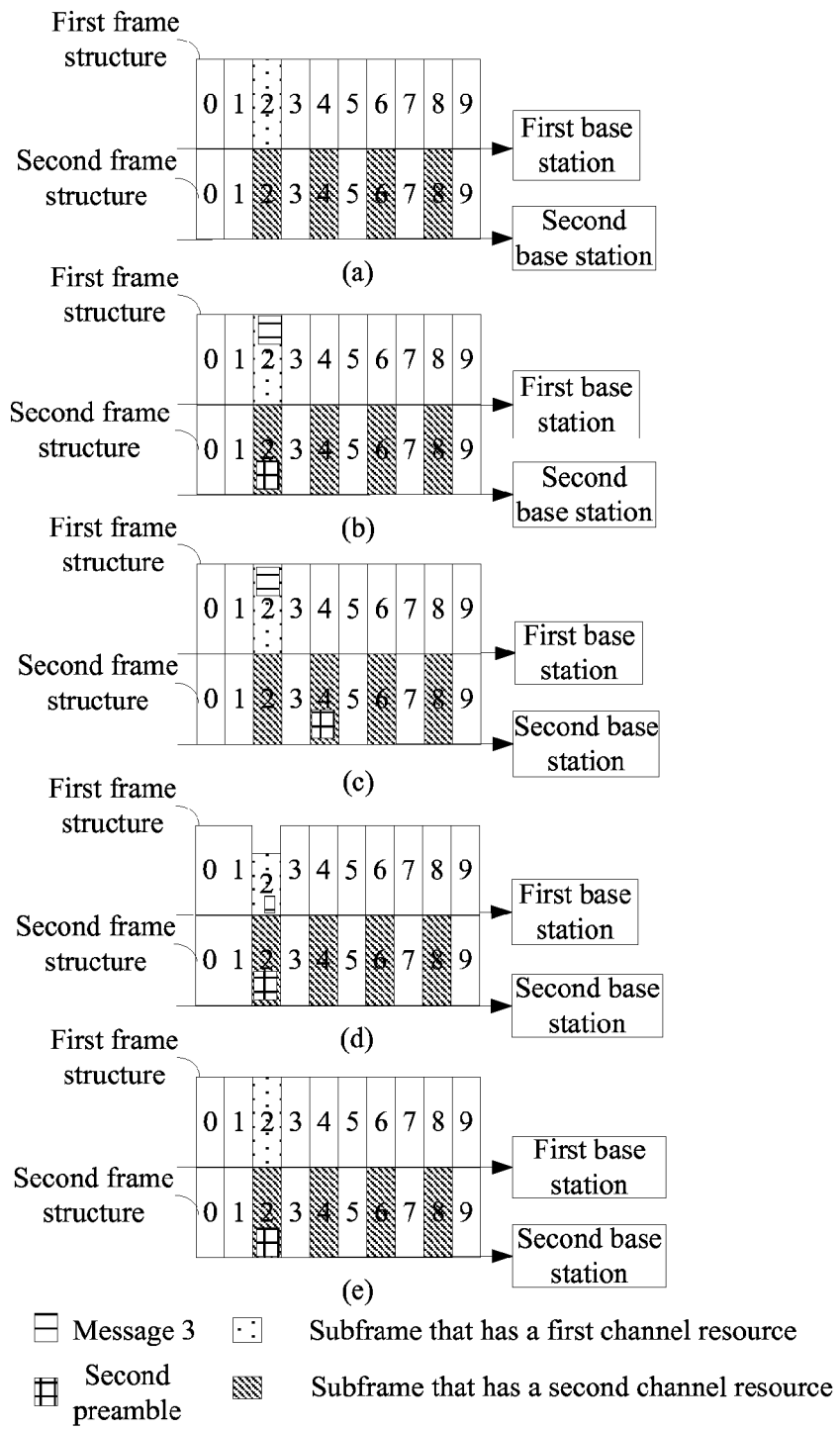
FIG. 13 is a schematic diagram of a principle of yet another data transmission method according to another embodiment.

That is, when the first preamble is a public preamble, the user equipment sets a message 3 in the first frame structure, and/or when the second preamble is a public preamble, the user equipment sets a message 3 in the second frame structure (that the first preamble is a public preamble is used as an example herein). When a sending time in a subframe that has a channel resource (that is the second channel resource) corresponding to the second preamble overlaps with a sending time in a subframe that has a channel resource (that is the first channel resource) occupied by the message 3 corresponding to the first preamble. As shown in FIG. 13, in FIG. 13(*a*), a subframe that has the first channel resource is a subframe 2 in a first frame structure, and subframes that has the second channel resource are a subframe 2, a subframe 4, a subframe 6, and a subframe 8 in a second frame structure. The subframe that has the first channel resource is the subframe 2 in the first frame structure, a subframe that has the second channel resource is the subframe 2 in the second frame structure, that is, the subframe that has the first channel resource and the subframe that has the second channel resource are in a same timeslot. In this case, a physical layer of the user equipment calculates transmit power of the subframe that has the channel resource corresponding to the second preamble and the subframe that has the channel resource occupied by the message 3 corresponding to the first preamble, that is, transmit power of the subframe 2 in the first frame structure and the subframe 2 in the second frame structure.

When the transmit power of the subframe 2 in the first frame structure and the subframe 2 in the second frame structure are less than or equal to the threshold transmit power of the user equipment, as shown in FIG. 13(*b*), a MAC sublayer allows the message 3 of the first preamble to be sent in the subframe 2 in the first frame structure, and allows the second preamble to be sent in the subframe 2 in the second frame structure. When the transmit power of the subframe 2 in the first frame structure and the subframe 2 in the second frame structure are greater than the threshold transmit power of the user equipment, as shown in FIG. 13(*c*), a MAC sublayer allows the second preamble to be sent in a next subframe corresponding to the second channel resource, that is, the subframe 4.

Optionally, as shown in FIG. 13(*d*), a MAC sublayer allows the message 3 of the first preamble to be sent in the subframe 2 in the first frame structure, and allows the second preamble to be sent in the subframe 2 in the second frame structure, and reduces transmit power of the subframe 2 in the first frame structure.

Optionally, as shown in FIG. 13(*e*), a MAC sublayer allows only the second preamble to be sent in the subframe 2 in the second frame structure, and cancels sending of the message 3 of the first preamble.

Figure 14:
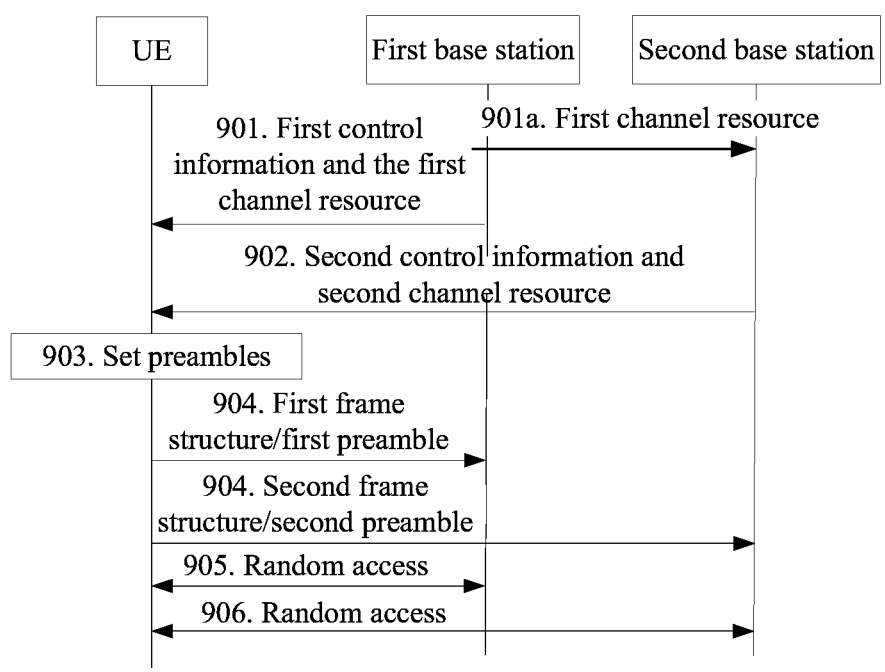
FIG. 14 is a schematic diagram of signaling exchange of a data transmission method according to still another embodiment.

Referring to a method shown in FIG. 14, before step 801, the method further includes the following steps.

901a. The first base station sends the first channel resource to the second base station.

901b. The second base station receives the first channel resource sent by the first base station, and configures the second channel resource for the user equipment according to the first channel resource, where a subframe carried by the second channel resource and a subframe carried by the first channel resource are in different timeslots.

Optionally, 901d. The second base station receives the first channel resource sent by the first base station, and sends, to the user equipment, a channel resource that does not overlap with the first channel resource and that is in the second channel resource or a part of a channel resource that does not overlap with the first channel resource and that is in the second channel resource.

Figure 15:
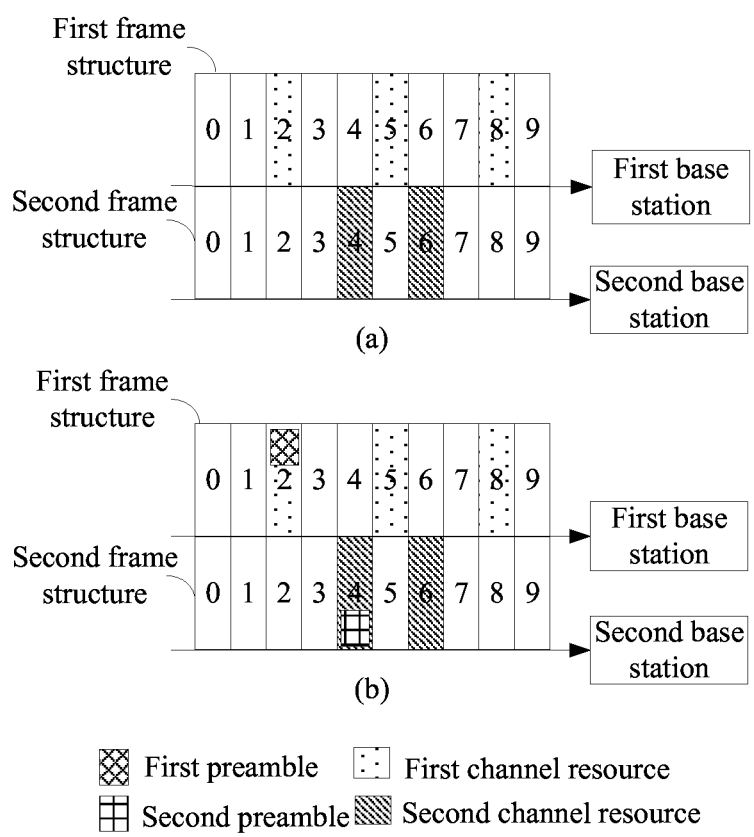
FIG. 15 is a schematic diagram of a principle of a data transmission method according to still another embodiment.

Specifically, as shown in FIG. 15, to avoid a case, occurring on the user equipment, in which a sending time in the first subframe that has the first channel resource and that is in the first frame structure overlaps with a sending time in the first subframe that has the second channel resource and that is in the second frame structure, the first base station and the second base station exchange their respective PRACH resource configurations to enable that PRACH resources of cells of the two base stations do not conflict with each other, and the first base station sends system broadcast including the first channel resource to the second base station.

As shown in FIG. 15(a), the first channel resource is a subframe 2, a subframe 5, and a subframe 8 in a first frame structure.

Referring to step 903, because the second base station configures an available PRACH for the UE by using dedicated signaling, after receiving the first channel resource sent by the first base station, the second base station may configure the second channel resource for the user equipment according to the first channel resource, that is, the second base station configures only a channel resource that does not conflict with the first channel resource as the second channel resource. As shown in FIG. 15(a), the second channel resource is configured to be a subframe 4 and a subframe 6 in a second frame structure. A subframe carried in the channel resource that does not conflict with the first channel resource and a subframe carried in the first channel resource are in different timeslots.

As shown in FIG. 15(b), the user equipment allows, according to the first channel resource, the first preamble to be sent in a subframe 2 in a first frame structure, and allows, according to the second channel resource, the second preamble to be sent in a subframe 4 in a second frame structure. In this case, a sending time in the first subframe that has the first channel resource and that is in the first frame structure does not overlap with a sending time in the first subframe that has the second channel resource and that is in the second frame structure.

During a process in which the first base station and the second base station exchange their respective PRACH resource configurations to enable that PRACH resources of cells in the two base stations do not conflict with each other, when the first base station has a demand for a large quantity of channel resources, a case in which the first channel resource occupies each subframe occurs. Optionally, to avoid the case, occurring on the user equipment, in which the sending time in the first subframe that has the first channel resource and that is in the first frame structure overlaps with the sending time in the first subframe that has the second channel resource and that is in the second frame structure, the second base station receives the first channel resource sent by the first base station, and sends, to the user equipment, a channel resource that does not overlap with the first channel resource and that is in the second channel resource or a part of a channel resource that does not overlap with the first channel resource and that is in the second channel resource.

Figure 16:
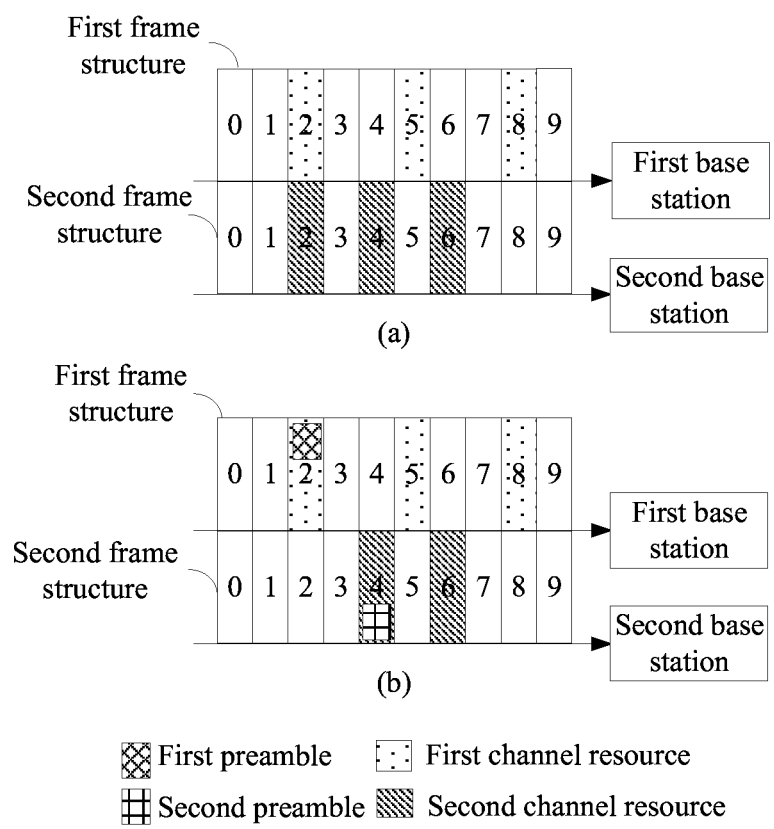
FIG. 16 is a schematic diagram of a principle of another data transmission method according to still another embodiment.

Specifically, as shown in FIG. 16, the first channel resource is a subframe 2, a subframe 5, and a subframe 8 in a first frame structure, and the second channel resource is a subframe 2, a subframe 4, and a subframe 6 in a second frame structure.

Referring to step 903, because the second base station configures an available PRACH for the UE by using dedicated signaling, after receiving the first channel resource sent by the first base station, the second base station configures a channel resource that does not overlap with the first channel resource and that is in the second channel resource (that is, the subframe 4 and the subframe 6) for the UE, or configures a part of a channel resource that does not overlap with the first channel resource (that is, the subframe 4 or the subframe 6) for the UE.

As shown in FIG. 16(b), the user equipment allows, according to the first channel resource, the first preamble to be sent in a subframe 2 in a first frame structure, and allows, according to the second channel resource configured by using dedicated signaling, the second preamble to be sent in a subframe 4 (or a subframe 6) in a second frame structure. In this case, a sending time in the first subframe that has the first channel resource and that is in the first frame structure does not overlap with a sending time in the first subframe that has the second channel resource and that is in the second frame structure.

According to the data transmission method, and the device and the system that are provided in the embodiments, by implementing simultaneous random access of user equipment to multiple base stations, a manner of parallel random access of user equipment to multiple base stations is implemented, thereby reducing delays of the random access of the user equipment to the multiple base stations and increasing a speed of data service transmission between the user equipment and the multiple base stations.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the embodiments includes a compact disc (CD), a laser disc, an optical disc, a digital versatile disc (DVD), a floppy disk and a Blue-ray disc, where the disk generally copies data by a magnetic means, and the disc copies data optically by a laser means. The foregoing combination should also be included in the protection scope of the computer-readable medium.

In conclusion, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   acquiring, by a user equipment, a first preamble and a second preamble, wherein the first preamble corresponds to a cell set of a primary timing advance group (PTAG) of a first base station, and the second preamble corresponds to a cell set of a secondary timing advance group (STAG) of a second base station;
   acquiring, by the user equipment, a first channel resource, wherein the first channel resource is a physical random access channel (PRACH) resource for the cell set of the PTAG of the first base station, and the first channel resource comprises a first subframe set for carrying the first preamble;
   acquiring, by the user equipment, a second channel resource, wherein the second channel resource is a PRACH resource for the cell set of the STAG of the second base station, and the second channel resource comprises a second subframe set for carrying the second preamble; and
   when a first subframe in the first subframe set overlaps with a first subframe in the second subframe set, performing the following:
      initiating, by the user equipment, random access to the first base station by sending the first preamble to the first base station in the first subframe in the first subframe set;
      postponing, by the user equipment, a sending time of the second preamble to the second base station from the first subframe in the second subframe set to a second subframe in the second subframe set, the second subframe in the second subframe set being later than the first subframe in the second subframe set; and
      initiating, by the user equipment, random access to the second base station by sending the second preamble to the second base station in the second subframe in the second subframe set.

2. The method according to claim 1, wherein:
   acquiring, by the user equipment, the first channel resource comprises receiving, by the user equipment, the first channel resource sent by the first base station, the first channel resource being sent using a system broadcast message; and
   acquiring, by the user equipment, the second channel resource comprises receiving, by the user equipment, the second channel resource sent by the second base station, the second channel resource being sent using dedicated signaling.

3. The method according to claim 1, wherein the method further comprises:
   wherein a sum of transmit power of the first subframe in the first subframe set and transmit power of the first subframe in the second subframe set is less than or equal to maximum transmit power of the user equipment; and
   wherein a sum of transmit power of the first subframe in the first subframe set and transmit power of the second subframe in the second subframe set is less than or equal to the maximum transmit power of the user equipment.

4. The method according to claim 1, wherein:
   the first preamble is a preamble selected by the user equipment, and the sending the first preamble to the first base station further comprises:
      when a sending time of a message corresponding to the first preamble overlaps with the sending time of the second preamble,
         postponing, by the user equipment to another subframe, the time of sending the message corresponding to the first preamble to the first base station.

5. The method according to claim 1, wherein the second preamble is sent to the second base station during a process of performing random access to the first base station.

6. A user equipment, comprising:
   a processor; and
   a non-transitory computer-readable storage medium coupled to the processor and storing programming instructions for execution by the processor, wherein the programming instructions instruct the processor to:
      acquire a first preamble and a second preamble, wherein the first preamble corresponds to a cell set of a primary timing advance group (PTAG) of a first base station, and the second preamble corresponds to a cell set of a secondary timing advance group (STAG) of a second base station;
      acquire a first channel resource, wherein the first channel resource is a physical random access channel (PRACH) resource for the cell set of the PTAG of the first base station, and the first channel resource comprises a first subframe set for carrying the first preamble;
      acquire a second channel resource, wherein the second channel resource is a PRACH resource for the cell set of the STAG of the second base station, and the second channel resource comprises a second subframe set for carrying the second preamble;
   wherein, when a first subframe in the first subframe set overlaps with a first subframe in the second subframe set, the programming instructions further instruct the processor to:
      initiate random access to the first base station by sending the first preamble to the first base station in the first subframe in the first subframe set;

postpone a sending time of the second preamble to the second base station from the first subframe in the second subframe set to a second subframe in the second subframe set, the second subframe in the second subframe set being later than the first subframe in the second subframe set; and initiate random access to the second base station by sending the second preamble to the second base station in the second subframe in the second subframe set.

7. The user equipment according to claim 6, wherein
the programming instructions further instruct the processor to:
receive, using a system broadcast message, the first channel resource sent by the first base station; and
receive, using dedicated signaling, the second channel resource sent by the second base station.

8. The user equipment according to claim 6, wherein:
a sum of transmit power of the first subframe in the first subframe set and transmit power of the first subframe in the second subframe set is less than or equal to maximum transmit power of the user equipment, and
a sum of transmit power of the first subframe in the first subframe set and transmit power of the second subframe in the second subframe set is less than or equal to the maximum transmit power of the user equipment.

9. The user equipment according to claim 6, wherein:
the first preamble is a preamble selected by the user equipment, and when a sending time of a message corresponding to the first preamble overlaps with the sending time of the second preamble, the programming instructions further instruct the processor to:
postpone, to another subframe, the time of sending the message corresponding to the first preamble to the first base station.

10. The user equipment according to claim 6, wherein:
the second preamble is sent to the second base station during a process in which the user equipment performs random access to the first base station.

11. The method according to claim 1, wherein:
the first preamble is a preamble selected by the user equipment, and the sending the first preamble to the first base station further comprises:
when a sending time of a message corresponding to the first preamble overlaps with the sending time of the second preamble,
adjusting, by the user equipment, transmit power of a subframe that carries the message corresponding to the first preamble, wherein a sum of adjusted transmit power of the subframe that carries the message corresponding to the first preamble and transmit power of the second subframe in the second subframe set is less than or equal to maximum transmit power of the user equipment.

12. The method according to claim 1, wherein:
the first preamble is a preamble selected by the user equipment, and the sending the first preamble to the first base station further comprises:
when a sending time of a message corresponding to the first preamble overlaps with the sending time of the second preamble,
canceling, by the user equipment, sending of the message corresponding to the first preamble.

13. The method according to claim 1, wherein:
the second preamble is a preamble selected by the user equipment, and the sending the second preamble to the second base station further comprises:
when a sending time of a message corresponding to the second preamble overlaps with a sending time of the first preamble,
postponing, by the user equipment to another subframe, the time of sending the message corresponding to the second preamble to the second base station.

14. The method according to claim 1, wherein:
the second preamble is a preamble selected by the user equipment, and the sending the second preamble to the second base station further comprises:
when a sending time of a message corresponding to the second preamble overlaps with a sending time of the first preamble,
adjusting, by the user equipment, transmit power of a subframe that carries the message corresponding to the second preamble, wherein a sum of adjusted transmit power of the subframe that carries the message corresponding to the second preamble and transmit power of the first subframe in the first subframe set is less than or equal to maximum transmit power of the user equipment.

15. The method according to claim 1, wherein:
the second preamble is a preamble selected by the user equipment, and the sending the second preamble to the second base station further comprises:
when a sending time of a message corresponding to the second preamble overlaps with a sending time of the first preamble,
canceling, by the user equipment, sending of the message corresponding to the second preamble.

16. The method according to claim 1, wherein the first preamble is sent to the first base station during a process of performing random access to the second base station.

17. The user equipment according to claim 6, wherein:
the first preamble is a preamble selected by the user equipment, and when a sending time of a message corresponding to the first preamble overlaps with the sending time of the second preamble, the programming instructions further instruct the processor to:
adjust transmit power of a subframe that carries the message corresponding to the first preamble, wherein a sum of adjusted transmit power of the subframe that carries the message corresponding to the first preamble and transmit power of the second subframe in the second subframe set is less than or equal to maximum transmit power of the user equipment.

18. The user equipment according to claim 6, wherein:
the first preamble is a preamble selected by the user equipment, and when a sending time of a message corresponding to the first preamble overlaps with the sending time of the second preamble, the programming instructions further instruct the processor to:
cancel sending of the message corresponding to the first preamble.

19. The user equipment according to claim 6, wherein:
the second preamble is a preamble selected by the user equipment, and when a sending time of a message corresponding to the second preamble overlaps with a sending time of the first preamble, the programming instructions further instruct the processor to:
postpone to another subframe, the time of sending the message corresponding to the second preamble to the second base station.

20. The user equipment according to claim 6, wherein:
the second preamble is a preamble selected by the user equipment, and when a sending time of a message corresponding to the second preamble overlaps with a sending time of the first preamble, the programming instructions further instruct the processor to:

adjust transmit power of a subframe that carries the message corresponding to the second preamble, wherein a sum of adjusted transmit power of the subframe that carries the message corresponding to the second preamble and transmit power of the first subframe in the first subframe set is less than or equal to maximum transmit power of the user equipment.

21. The user equipment according to claim 6, wherein:

the second preamble is a preamble selected by the user equipment, and when a sending time of a message corresponding to the second preamble overlaps with a sending time of the first preamble, the programming instructions further instruct the processor to:

cancel sending of the message corresponding to the second preamble.

22. The user equipment according to claim 6, wherein the first preamble is sent during a process in which the user equipment performs random access to the second base station.

* * * * *